United States Patent
Byrapura Doddegowda et al.

(10) Patent No.: US 11,323,369 B2
(45) Date of Patent: May 3, 2022

(54) TRANSFORMING A MULTI-LEVEL HYBRID HIERARCHICAL FORWARDING INFORMATION BASE FORMAT

(71) Applicant: Juniper Networks, Inc., Sunnyvale, CA (US)

(72) Inventors: Madhu Byrapura Doddegowda, Bangalore (IN); Prashanth Ramaprasad, Bangalore (IN); Puneet Kedia, Bangalore (IN); Ramakrishna Manjunath, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 30 days.

(21) Appl. No.: 16/916,233

(22) Filed: Jun. 30, 2020

(65) Prior Publication Data

US 2021/0359941 A1 Nov. 18, 2021

(30) Foreign Application Priority Data

May 18, 2020 (IN) .............................. 202041020812

(51) Int. Cl.
*H04L 45/745* (2022.01)
(52) U.S. Cl.
CPC ................... *H04L 45/745* (2013.01)
(58) Field of Classification Search
CPC ....... H04L 45/02; H04L 45/12; H04L 45/122; H04L 45/745
See application file for complete search history.

(56) References Cited

U.S. PATENT DOCUMENTS

| 8,811,158 | B1 | 8/2014 | Addepalli | |
|---|---|---|---|---|
| 10,616,175 | B2* | 4/2020 | Raj | H04L 61/2007 |
| 2016/0212050 | A1* | 7/2016 | Yin | H04L 45/08 |
| 2017/0264552 | A1* | 9/2017 | Duda | H04L 61/6022 |
| 2019/0280969 | A1* | 9/2019 | Liu | H04L 45/48 |

OTHER PUBLICATIONS

Extended European Search Report for Application No. EP20192223.4, dated Dec. 23, 2020 5 pages.

* cited by examiner

*Primary Examiner* — Donald L Mills
(74) *Attorney, Agent, or Firm* — Harrity & Harrity, LLP

(57) ABSTRACT

A network device may receive forwarding data associated with a multi-level hybrid hierarchy forwarding information base of the network device. The network device may process the forwarding data to generate a first set of transformed forwarding next hop entries. The network device may process the first set of transformed forwarding next hop entries, associated with default forwarding classes, to generate a second set of transformed forwarding next hop entries. The network device may process the first set of transformed forwarding next hop entries, associated with all classes of traffic, to generate a third set of transformed forwarding next hop entries. The network device may group the sets of transformed forwarding next hop entries, based on transformed group next hop entries, to generate a final set of transformed forwarding next hop entries. The network device may transform the final set of transformed forwarding next hop entries into a particular format.

20 Claims, 18 Drawing Sheets

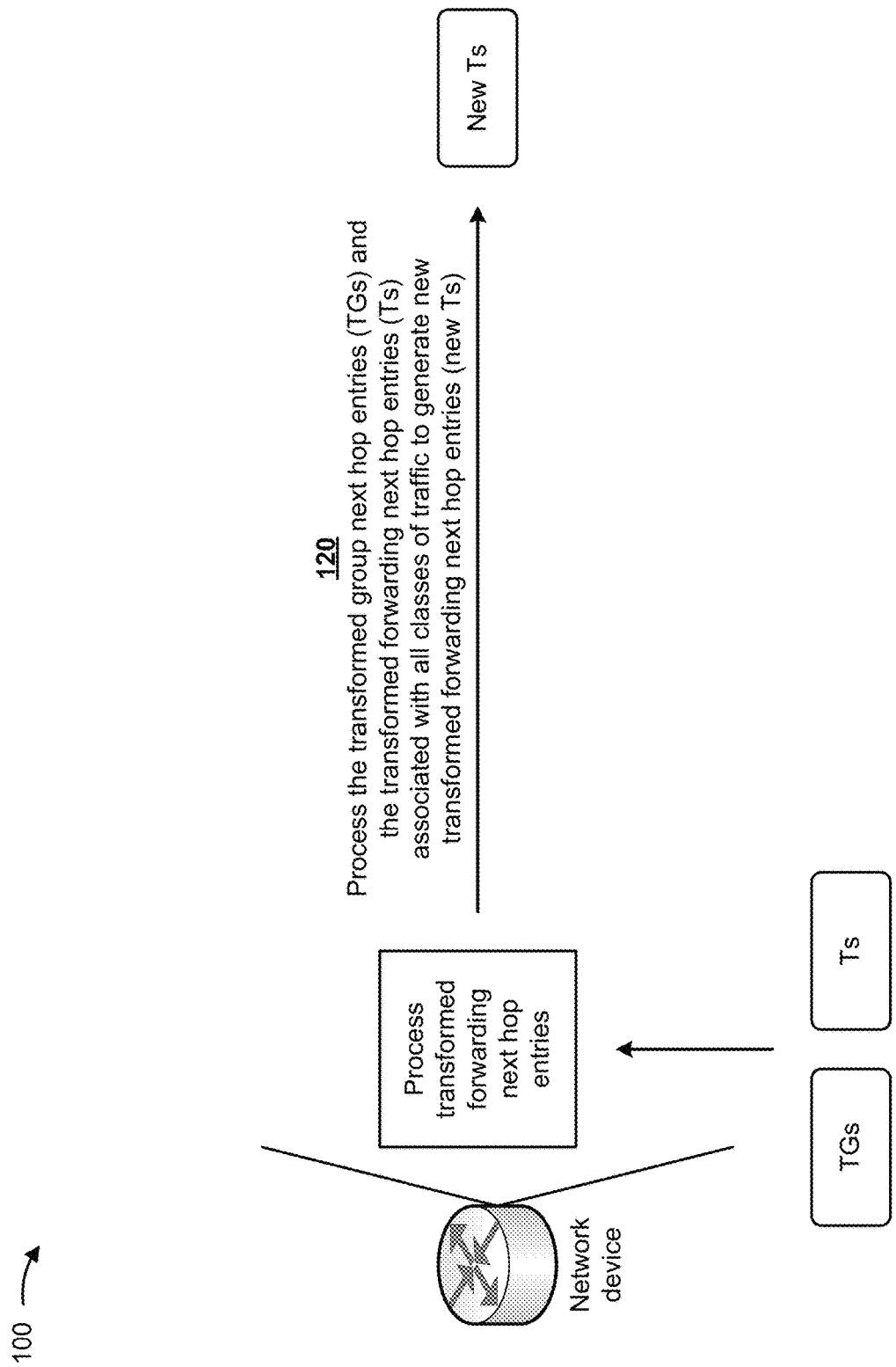

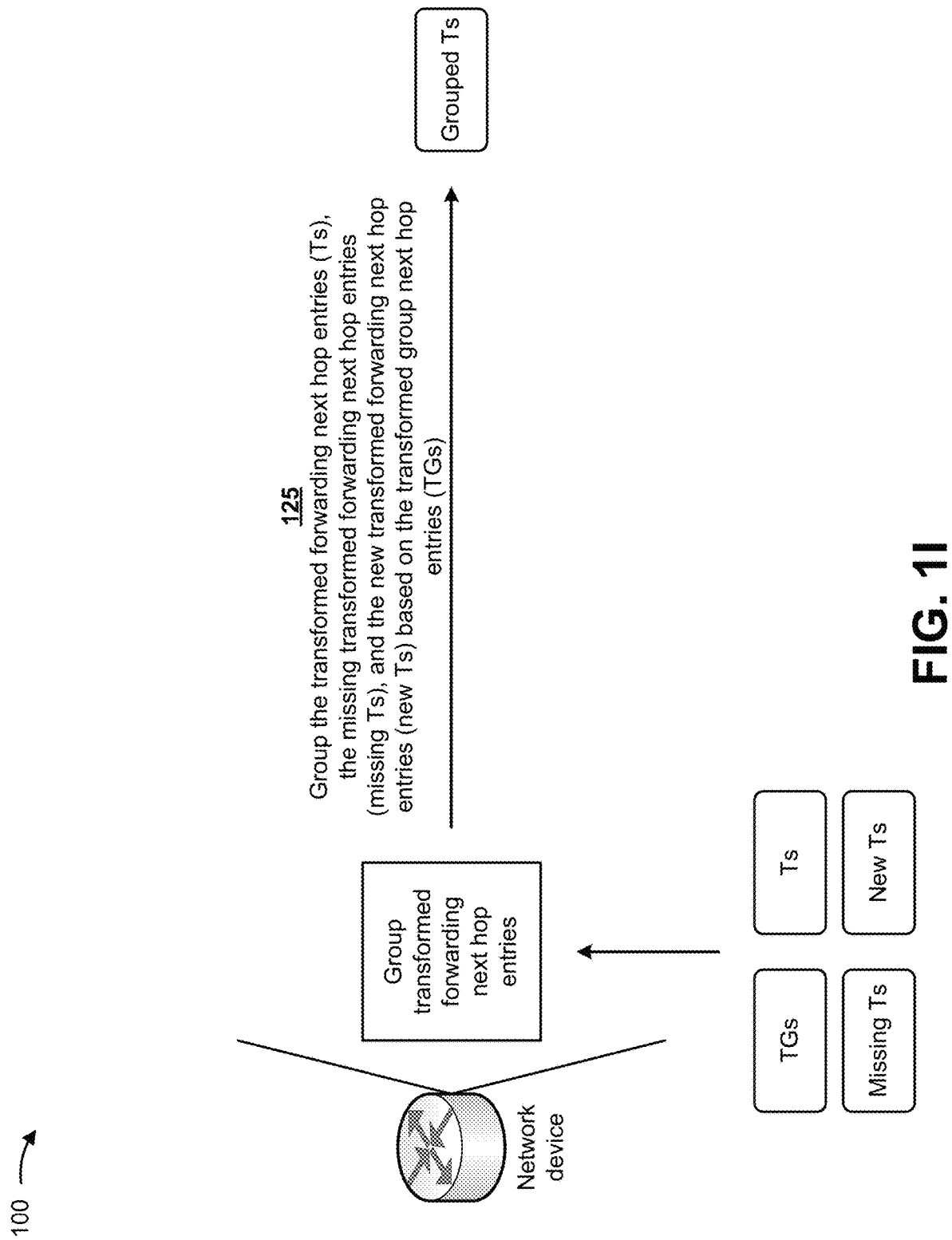

TRANSFORMING A MULTI-LEVEL HYBRID HIERARCHICAL FORWARDING INFORMATION BASE FORMAT

CROSS-REFERENCE TO RELATED APPLICATION

This application claims priority to Indian Provisional Application No. 202041020812 entitled "TRANSFORMING A MULTI-LEVEL HYBRID HIERARCHICAL FORWARDING INFORMATION BASE FORMAT," filed on May 18, 2020. The entire content of which is expressly incorporated herein by reference.

BACKGROUND

A forwarding information base (FIB) may be a data structure that includes forwarding data, such as information identifying a destination, information identifying a next hop in a route to the destination, and/or the like. A network device may perform a lookup in the FIB to identify forwarding data and use the forwarding data to forward a packet to a destination.

SUMMARY

According to some implementations, a method may include receiving, by a network device, forwarding data associated with a multi-level hybrid hierarchy forwarding information base of the network device; processing, by the network device, the forwarding data to generate transformed group next hop entries and a first set of transformed forwarding next hop entries; processing, by the network device, the transformed group next hop entries and the first set of transformed forwarding next hop entries, associated with default forwarding classes, to generate a second set of transformed forwarding next hop entries; processing, by the network device, the transformed group next hop entries and the first set of transformed forwarding next hop entries, associated with all classes of traffic, to generate a third set of transformed forwarding next hop entries; grouping, by the network device, the first set of transformed forwarding next hop entries, the second set of transformed forwarding next hop entries, and the third set of transformed forwarding next hop entries, based on the transformed group next hop entries, to generate a final set of transformed forwarding next hop entries; transforming, by the network device, the final set of transformed forwarding next hop entries into a particular format; and storing, by the network device, the final set of transformed forwarding next hop entries, in the particular format, in the forwarding information base.

According to some implementations, a network device may include one or more memories and one or more processors. In some implementations, the one or more processors are communicatively coupled to the one or more memories. The one or more processors may be configured to: receive forwarding data associated with a multi-level hybrid hierarchy forwarding information base of the network device; process the forwarding data to generate transformed group next hop entries and a first set of transformed forwarding next hop entries; process the transformed group next hop entries and the first set of transformed forwarding next hop entries, associated with default forwarding classes, to generate a second set of transformed forwarding next hop entries; process the transformed group next hop entries and the first set of transformed forwarding next hop entries, associated with all classes of traffic, to generate a third set of transformed forwarding next hop entries; group the first set of transformed forwarding next hop entries, the second set of transformed forwarding next hop entries, and the third set of transformed forwarding next hop entries, based on the transformed group next hop entries, to generate a final set of transformed forwarding next hop entries; transform the final set of transformed forwarding next hop entries into a particular format; receive traffic associated with a network; and forward the traffic based on the final set of transformed forwarding next hop entries in the particular format.

According to some implementations, a non-transitory computer-readable medium may store one or more instructions. The one or more instructions, when executed by one or more processors of a network device, may cause the one or more processors to: receive forwarding data associated with a multi-level hybrid hierarchy forwarding information base of the network device; process the forwarding data to generate transformed group next hop entries and a first set of transformed forwarding next hop entries; process the transformed group next hop entries and the first set of transformed forwarding next hop entries, associated with default forwarding classes, to generate a second set of transformed forwarding next hop entries; process the transformed group next hop entries and the first set of transformed forwarding next hop entries, associated with all classes of traffic, to generate a third set of transformed forwarding next hop entries; group the first set of transformed forwarding next hop entries, the second set of transformed forwarding next hop entries, and the third set of transformed forwarding next hop entries, based on the transformed group next hop entries, to generate a final set of transformed forwarding next hop entries; transform the final set of transformed forwarding next hop entries into a particular format; store the final set of transformed forwarding next hop entries, in the particular format, in the forwarding information base; receive traffic associated with a network; and forward the traffic based on the final set of transformed forwarding next hop entries in the particular format.

BRIEF DESCRIPTION OF THE DRAWINGS

FIGS. 1A-1L are diagrams of one or more example implementations described herein.

DETAILED DESCRIPTION

Figure 1A:
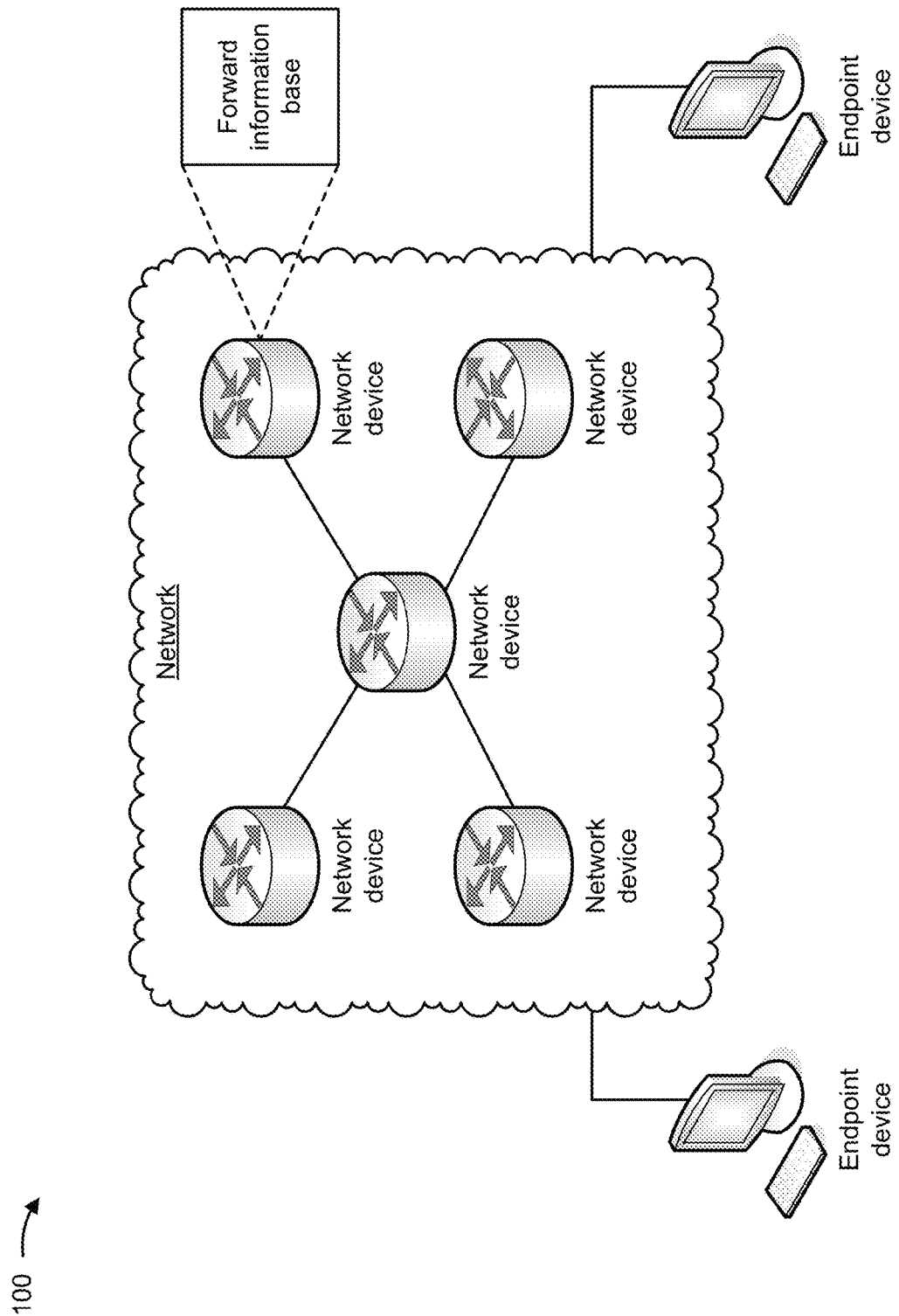

The following detailed description of example implementations refers to the accompanying drawings. The same reference numbers in different drawings may identify the same or similar elements.

A FIB on a network device may store forwarding data associated with a large quantity (e.g., on the order of millions) of destinations. The FIB may be a hierarchical FIB that includes multiple levels. Incoming traffic received by the network device may be classified into different forwarding classes. The incoming traffic may be routed to different outbound interfaces at different levels in the hierarchy. The network device may distribute the traffic (e.g., make load sharing decisions) at different levels in the hierarchy.

In some hierarchical FIBs, such as multi-level hybrid hierarchical FIBs, there may be one or more sub-hierarchies. Certain sub-hierarchies may be configured to process certain forwarding classes of the incoming traffic (e.g., different sub-hierarchies may be configured to process different forwarding classes), certain sub-hierarchies may be configured without a forwarding class configuration, and/or the like. As a result, the network device may be unable to determine traffic distribution across outbound interfaces of the network device for a route, since certain sub-hierarchies of the FIB may not identify traffic distribution for all forwarding classes for traffic to be forwarded via the route. This may waste computing resources (e.g., processing resources, memory resources, and/or the like), networking resources, and/or the like associated with determining traffic distribution across outbound interfaces of the network device when using such a multi-level hybrid hierarchical FIB.

Some implementations described herein enable a network device to transform a multi-level hybrid hierarchical FIB format. For example, the network device may process forwarding data associated with a multi-level hybrid hierarchy FIB of the network device to generate transformed group next hop entries and/or a set of transformed forwarding next hop entries. The network device may process the transformed group next hop entries and/or the set of transformed forwarding next hop entries to generate one or more addition sets of transformed forwarding next hop entries (e.g., that include one or more missing transformed next hop entries from the set of transformed forwarding next hop entries, one or more new transformed next hop entries of the set of transformed forwarding next hop entries, and/or the like). The sets of transformed forwarding next hop entries may be grouped together based on the transformed group next hop entries (e.g., based on a forwarding class associated with the transformed forwarding next hop entries) to form a final set of transformed forwarding next hop entries. The network device may transform the final set of transformed forwarding next hop entries into a particular format (e.g., that is configured to represent all traffic distribution for all forwarding classes).

The network device may receive traffic and may forward the traffic based on the final set of transformed forwarding next hop entries in the particular format. As a result, the network device may be enabled to determine traffic distribution across outbound interfaces for all forwarding classes of traffic associated with the network. This may conserve computing resources and/or network resources that would have otherwise been used determining traffic distribution for a given destination and a specific forwarding class using a multi-level hybrid hierarchical FIB format (e.g., that may not include a full traffic distribution for all forwarding classes for a destination).

FIGS. 1A-1L are diagrams of one or more example(s) 100 associated with determining traffic distribution in a hybrid hierarchical forwarding information base (FIB). As shown in FIGS. 1A-1L, example 100 includes one or more endpoint devices and one or more network device devices communicating via a network.

As shown in FIG. 1A, a network device of the one or more network devices may include an FIB for storing forwarding data for a plurality of destinations, such as an endpoint device, another network device, and/or the like. The FIB may be a data structure that stores forwarding data associated with one or more destinations in the network, in another network, and/or the like. The forwarding data associated with a destination may include information identifying an address of the destination (e. g., an Internet protocol (IP) address, a port address, and/or the like), information identifying a next hop in a route to the destination, information identifying an interface associated with the destination (e. g., a media access control (MAC) identifier), and/or the like. A destination may be an endpoint device, another network device, and/or the like.

The network device may receive, process, and/or transmit packets. The packets may be data plane packets (e.g., packets that travel through the network device, and are not originated or terminated at the network device), control plane packets (e.g., packets that are originated in the control plane of the network device (e.g., generated by the network device) or terminated in the control plane of the network device (e.g., the network device is the destination of the packet)), and/or the like. The network device may receive a packet, perform a lookup in the FIB on the network device to identify forwarding data associated with the packet (e. g., information identifying a destination of the packet, information identifying a next hop in a route to the destination, and/or the like), and transmit the packet to the next hop based on the forwarding data.

The network device may populate and maintain the forwarding data in the FIB based on various techniques. For example, the network device may learn routes in the network and/or updates to the routes in the network based on one or more routing protocols, such as a routing information protocol (RIP), an open shortest path first (OSPF) protocol, a border gateway protocol (BGP), an interior gateway routing protocol (IGRP), an enhanced IGRP (EIGRP), a distance-vector routing protocol, an intermediate system to intermediate system (IS-IS) protocol, and/or the like, and may store information identifying the routes and/or the updates to the routes, as forwarding data, in the FIB. In some implementations, the FIB may be populated with static forwarding data, which may be forwarding data configured and/or maintained by a user such as a network administrator.

The network device and/or the FIB may include one or more classifier tables for determining a forwarding class of a packet received by the network device. The forwarding class may be a group and/or an identifier assigned to an incoming packet based on one or more of the parameters of the incoming packet (e.g., packet code-point values and/or the like). The forwarding class may enable the network device to group packets into different categories, which may then be used to define per-hop behaviour (PHB), assign the packets to output queues for transmission, and/or the like. The forwarding classes may enable the network device to group packets for transmission and to assign packets to one or more output queues. The forwarding classes may identify a priority of a packet, identify a delivery protocol (e.g., best-effort delivery and/or the like) for the packet, and/or the like. The network device may determine a forwarding class for a packet by identifying an entry in a header of the packet (e.g., a differentiated services code point (DSCP) entry, a type of service (ToS) entry, and/or the like). The network device may identify (e.g., using a lookup operation) an entry in the classifier table, corresponding to the entry in the header of the packet, that identifies a forwarding class (e.g., the classifier table may associate the entry in the header of the packet to a forwarding class). The network device and/or the FIB may include classifier tables associated with certain incoming interfaces, certain destinations, and/or the like. Upon receiving a packet, the network device may determine a forwarding class associated with the packet, as described above. The network device may generate forwarding class information (e.g., indicating the forwarding class) and may include the forwarding class information within the packet (e.g., within a header of the packet).

Incoming packets to the network device may be split into multiple paths of a route at different levels of a hierarchy of the FIB. For example, the network device may determine, based on forwarding data stored in the FIB, to segregate outgoing paths based on a forwarding class of the packet. In some implementations, certain hierarchies of the FIB may be configured for processing a subset of all forwarding classes, or certain hierarchies of the FIB may be configured without a forwarding class-based forwarding protocol. For example, the FIB may have a hybrid hierarchical FIB (e.g., including a hybrid class-based forwarding hierarchy) format.

Figure 1B:
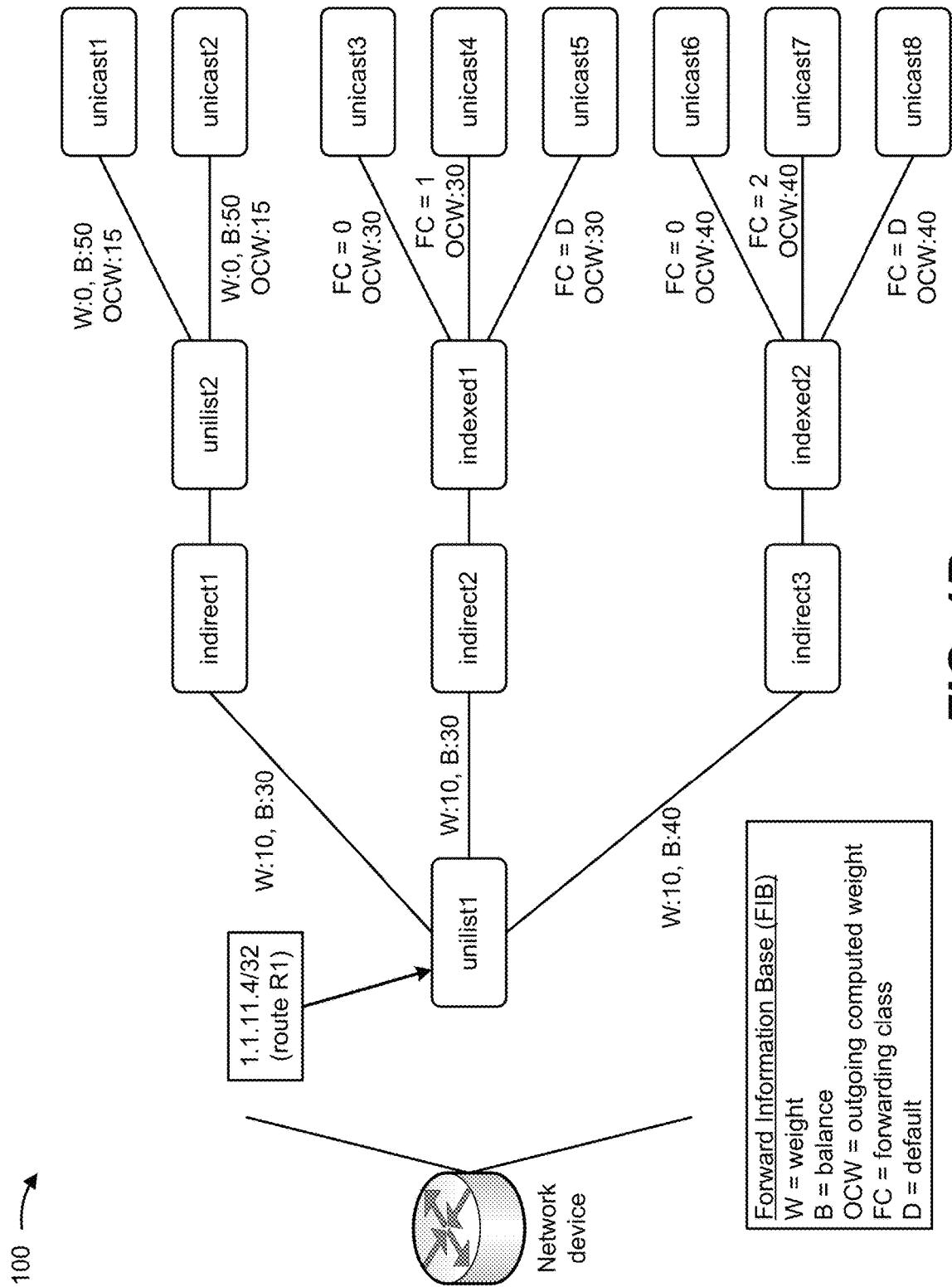

As shown in FIG. 1B, an example hybrid hierarchical FIB format may include forwarding data associated with a route to a destination. For example, the FIB may store forwarding data associated with a destination prefix (e.g., an IP route, such as 1.1.11.4/32) associated with a route (e.g., route R1). The forwarding data may identify a top level next hop associated with the route prefix (e.g., unilist1) that is a first next hop associated with the route. The forwarding data may identify one or more types of forwarding next hops (e.g., to other network devices or network entities) for the route. The one or more types of forwarding next hops may include aggregate next hops, indirect next hops, indexed next hops, forwarding next hops, and/or the like.

An aggregate next hop may be an equal-cost multi-path (ECMP) next hop. An aggregate next hop may identify one or more next hops (e.g., next hops after the aggregate next hop). Paths to the one or more next hops from the aggregate next hop may be associated with one or more parameters (e.g., weight, balance, and/or the like). A weight parameter may identify a priority of a path (e.g., a lowest weight value may identify a primary path, a higher weight value may identify a backup or inactive path, and/or the like). A balance parameter may identify a load balance to be applied for traffic among the paths with the same weight (e.g., a balance value of 30 associated with a path may indicate that 30% of traffic from the aggregate next hop should be transmitted via the path). A sum of balance parameters for all paths from an aggregate next hop may be equal to the total balance of traffic entering the aggregate next hop (e.g., if a balance of traffic entering the aggregate next hop is 100, the sum of balance parameters for all paths from the aggregate next hop may be 100).

An indirect next hop may identify indirect next hop forwarding data (e.g., from the indirect next hop to an aggregate next hop, an indexed next hop, and/or the like). The indirect next hop may be common to a plurality of routes. An indexed next hop may identify one or more paths from the indexed next hop to a forwarding next hop. A path of the one or more paths may be associated with a forwarding class. For example, the forwarding data may identify 3 paths from the indexed next hop to 3 forwarding next hops. A first path may be associated with a first forwarding class, a second path may be associated with a second forwarding class, and a third path may be associated with the remaining forwarding classes (e.g., all other forwarding classes except the first and second forwarding classes). A forwarding next hop may be associated with an outbound interface (e.g., associated with a destination for traffic) of the network device. For example, the forwarding next hop may be associated with a unicast transmission (e.g., a one-to-one transmission) to a destination. A forwarding next hop may be associated with an outgoing computed weight. The outgoing computed weight may indicate a balance of traffic associated with the forwarding next hop and/or the corresponding outbound interface (e.g., may indicate a percentage or ratio of traffic that is to be distributed to the forwarding next hop).

For example, as shown in FIG. 1B, the example multi-level hybrid hierarchical FIB format may include forwarding data for a primary path for route R1 identifying the top level next hop (e.g., unilist1). The forwarding data may identify three indirect next hops after the top level next hop (e.g., indirect1, indirect2, and indirect3). The forwarding data may identify that a path from unilist1 to indirect1 has a balance of 30 (e.g., indicating that 30% of traffic from unilist1 is associated with the path), a path from unilist1 to indirect2 has a balance of 30 (e.g., indicating that 30% of traffic from unilist1 is associated with the path), and a path from unilist1 to indirect3 has a balance of 40 (e.g., indicating that 40% of traffic from unilist1 is associated with the path).

The forwarding data may identify that traffic from indirect1 should be forwarded to unilist2. As unilist2 may be an aggregate next hop, unilist2 may split traffic to different paths from unilist2 to forwarding next hops (e.g., unicast1 and unicast2) equally (e.g., a balance of 50 for each path). In some implementations, a split of traffic between unicast1 and unicast2 may not be equal (e.g., where a different balance is indicated by the forwarding data). As the balance of traffic entering unilist2 is 30, a path from unilist2 to unicast1 may have an outgoing computed weight of 15 (e.g., 50% of 30) and a path from unilist2 to unicast2 may have an outgoing computed weight of 15 (e.g., totaling 30 between both paths). The paths from unilist2 may not conform to class-based forwarding. That is, the paths from unilist2 may not be associated with any specific forwarding class (e.g., the paths may be for all forwarding classes).

The forwarding data may identify that traffic from indirect2 should be sent to indexed1. The forwarding data may identify that paths from indexed1 to forwarding next hops (e.g., unicast3, unicast4, and unicast5) are associated with specific forwarding classes. For example, a path from indexed1 to unicast3 may be associated with a first forwarding class (e.g., FC 0), a path from indexed1 to unicast4 may be associated with a second forwarding class (e.g., FC 1), and a path from indexed1 to unicast5 may be associated with a default forwarding class (e.g., all forwarding classes not specifically identified by indexed1). The paths from indexed1 may be associated with a same balance as the balance of traffic entering indexed1 (e.g., each of the three paths from indexed1 may be associated with outgoing computed weights of 30).

The forwarding data may identify that traffic from indirect3 should be sent to indexed3. The forwarding data may identify that paths from indexed3 to forwarding next hops (e.g., unicast6, unicast7, and unicast8) are associated with specific forwarding classes. For example, a path from indexed2 to unicast6 may be associated with the first forwarding class (e.g., FC 0), a path from indexed2 to unicast7 may be associated with a third forwarding class (e.g., FC 2), and a path from indexed1 to unicast5 may be associated with a default forwarding class (e.g., all forwarding classes not specifically identified by indexed2). The paths from indexed2 may be associated with a same balance as the balance of traffic entering indexed2 (e.g., each of the three paths from indexed2 may be associated with outgoing computed weights of 40).

In some implementations, the forwarding data may identify one or more additional paths that are not shown in FIG. 1B. The additional paths may be associated with backup or inactive paths (e.g., the forwarding data may identify that a weight of the additional paths is greater than 10). The example multi-level hybrid hierarchical FIB format may be hybrid in that the FIB includes class-based forwarding (e.g., from the indexed next hops) and non-class-based forwarding (e.g., from the aggregate next hops, such as unilist2). The multi-level hybrid hierarchical FIB format may include 4 levels (e.g., a first level of unilist1; a second level of indirect1, indirect2, and indirect3; a third level of unilist2, indexed1, and indexed2; and a fourth level of unicast1-unicast8). In some implementations the multi-level hybrid hierarchical FIB format may include more than or less than 4 levels.

Figure 1C:
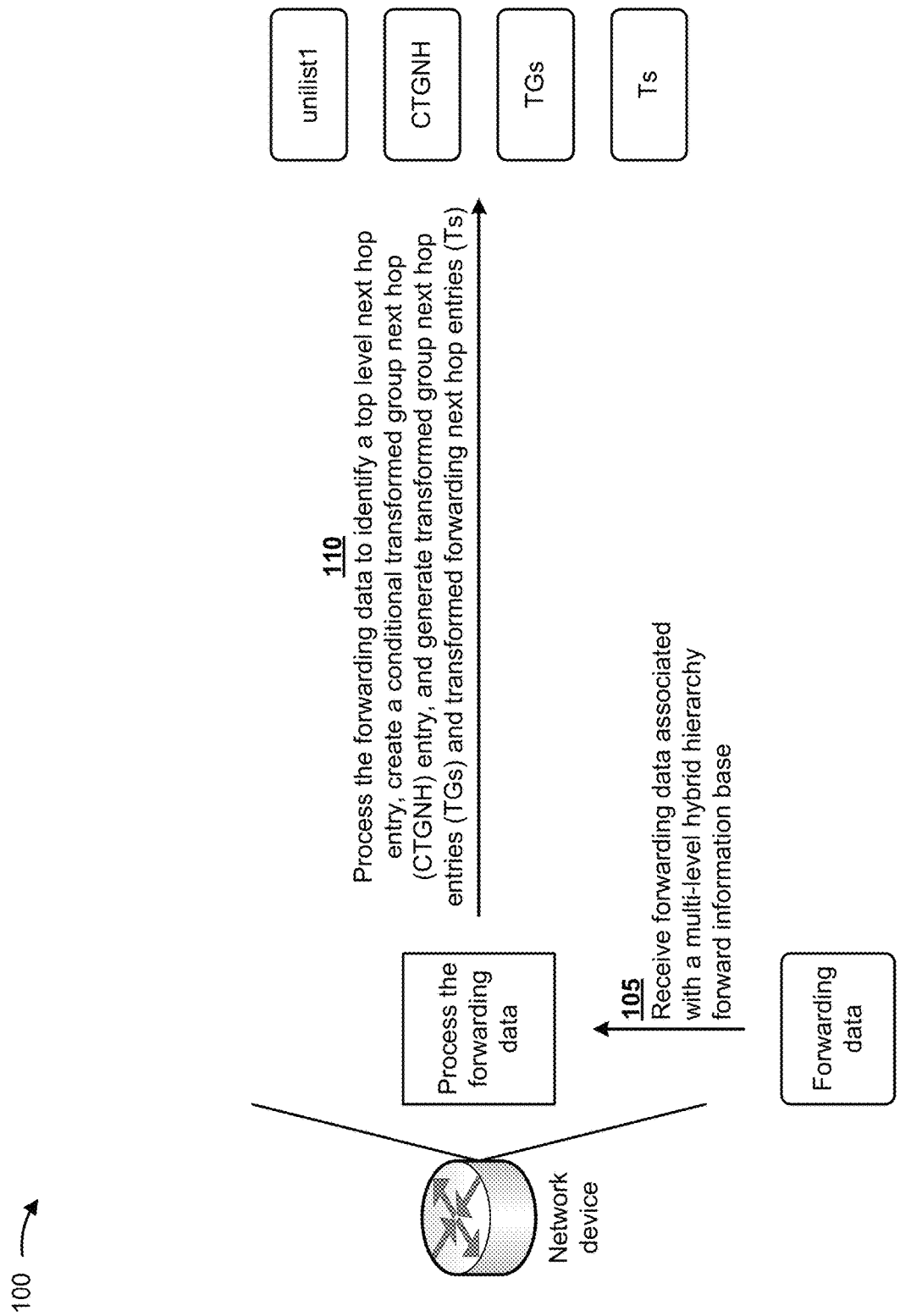

As shown in FIG. 1C, and by reference number 105, the network device may receive forwarding data associated with a multi-level hybrid hierarchy FIB (e.g., the multi-level hybrid hierarchy FIB described above with respect to FIG. 1B). As shown by reference number 110, the network device may process the forwarding data to identify a top level next hop entry, create a conditional transformed group next hop (CTGNH) entry, and generate transformed group next hop entries (TGs) and transformed forwarding next hop entries (Ts). As described above, the forwarding data for route R1 may identify that the top level next hop entry is unilist1. The conditional transformed group next hop entry may be based on the identified top level next hop entry (e.g., the conditional transformed group next hop entry may be the identified top level next hop entry).

The transformed group next hop entries may identify one or more transformed forwarding next hop entries. A transformed group next hop entry may include one or more transformed forwarding next hop entries that are associated with a same forwarding class. For example, a first transformed group next hop entry may include one or more transformed forwarding next hop entries that are associated with a first forwarding class (e.g., FC 0), a second transformed group next hop entry may include one or more transformed forwarding next hop entries that are associated with a second forwarding class (e.g., FC 1), and so forth.

The transformed forwarding next hop entries may identify an outgoing computed weight, a forwarding class, an outbound interface, and/or other forwarding information (e.g., one or more next hops from the top level next hop to the forwarding next hop). For example, a transformed forwarding next hop entry may be a path associated with route R1.

The network device may process the forwarding data based on a type of the forwarding next hop identified in the forwarding data. For example, if the type of the forwarding next hop is an indirect next hop, the network device may process the forwarding data to identify a next entry in the forwarding data after the indirect next hop. If the type of the forwarding next hop is an indexed next hop, the network device may determine one or more child next hop(s) (e.g., next hops after the indexed next hop). The network device may determine a forwarding class associated with a path from the indexed next hop to the child next hop(s). The network device may determine one or more forwarding classes associated with a default forwarding class of the indexed next hop (e.g., the network device may determine one or more forwarding classes that the indexed next hop is not explicitly configured to handle). If the type of the forwarding next hop is a forwarding next hop, the network device may create a transformed forwarding next hop associated with the forwarding next hop.

For example, the network device may process the forwarding data associated with a first type of next hop (e.g., aggregate next hops) to generate a first subset of transformed forwarding next hop entries. The network device may process the forwarding data associated with a second type of next hop (e.g., indirect next hops) to generate a second subset of transformed forwarding next hop entries. The network device may process the forwarding data with a third type of next hop (e.g., indexed next hops) to generate a third subset of transformed forwarding next hop entries. The network device may process the forwarding data associated with a fourth type of next hop (e.g., forwarding next hops) to generate a fourth subset of transformed forwarding next hop entries. The network device may combine the first subset of transformed forwarding next hop entries, the second subset of transformed forwarding next hop entries, the third subset of transformed forwarding next hop entries, and the fourth subset of transformed forwarding next hop entries to generate the first set of transformed forwarding next hop entries. The first set of transformed forwarding next hop entries may identify each next hop associated with a path to an outbound interface (e.g., to a forwarding next hop or a unicast, as shown in FIG. 1B). A transformed forwarding next hop entry may be associated with a corresponding outbound interface of the network device.

Figure 1D:
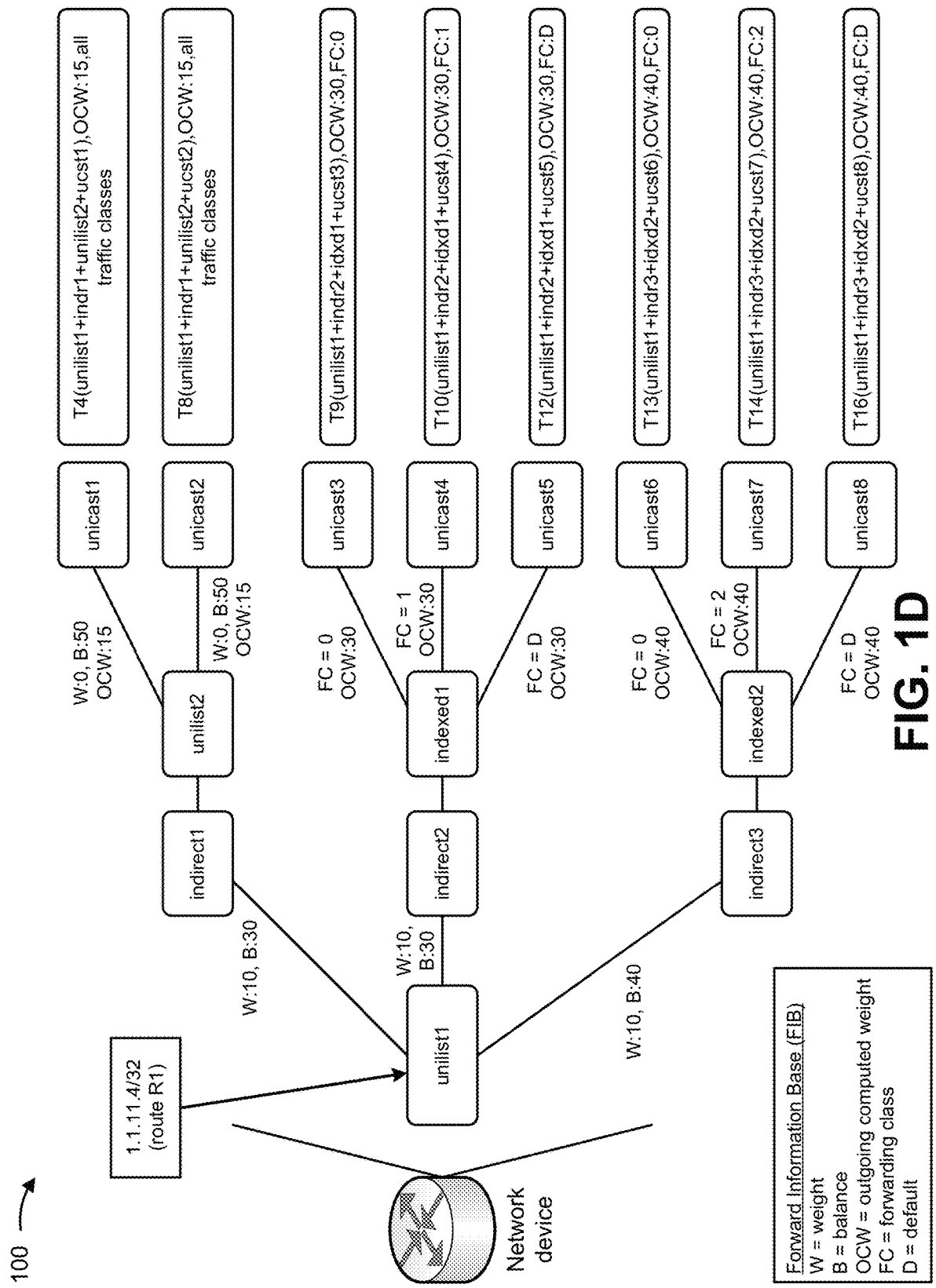

As shown in FIG. 1D, a first set of transformed forwarding next hop entries may include T4 (e.g., associated with unicast1), T8 (e.g., associated with unicast2), T9 (e.g., associated with unicast3), T10 (e.g., associated with unicast4), T12 (e.g., associated with unicast5), T13 (e.g., associated with unicast6), T14 (e.g., associated with unicast7), and T16 (e.g., associated with unicast8). A transformed forwarding next hop entry may identify an associated path. For example, T4 may identify a path from unilist1 to indirect1 to unilist2 to unicast1, T10 may identify a path from unilist1 to indirect2 to indexed1 to unicast4, and so forth. A transformed forwarding next hop entry may identify an associated outgoing computed weight. For example, T4 may identify an outgoing computed weight of 15, T10 may identify an outgoing computed weight of 30, T14 may identify an outgoing computed weight of 40, and so forth. A transformed forwarding next hop entry may identify an associated forwarding class. For example, T4 may identify that all forwarding classes are associated with T4, T9 may identify an associated forwarding class of FC 0, T10 may identify an associated forwarding class of FC 1, T14 may identify an associated forwarding class of FC 2, and so forth.

The transformed group next hop entries may include a first transformed group next hop entry associated with the first forwarding class (e.g., FC 0), a second transformed group next hop entry associated with the second forwarding class (e.g., FC 1), a third transformed group next hop entry associated with the third forwarding class (e.g., FC 2), a fourth transformed group next hop entry associated with the default forwarding class (e.g., FC D), and/or the like. The first transformed group next hop entry may include one or more transformed forwarding next hop entries associated with the first forwarding class (e.g., T9 and T13). The second transformed group next hop entry may include one or more transformed forwarding next hop entries associated with the second forwarding class (e.g., T10). The third transformed group next hop entry may include one or more transformed forwarding next hop entries associated with the third forwarding class (e.g., T14). The fourth transformed group next hop entry may include one or more transformed forwarding next hop entries associated with the default forwarding class (e.g., T12 and T16). T4 and T8 may not be included in a transformed group next hop entry as T4 and T8 may not be associated with a specific forwarding class.

Figure 1E:
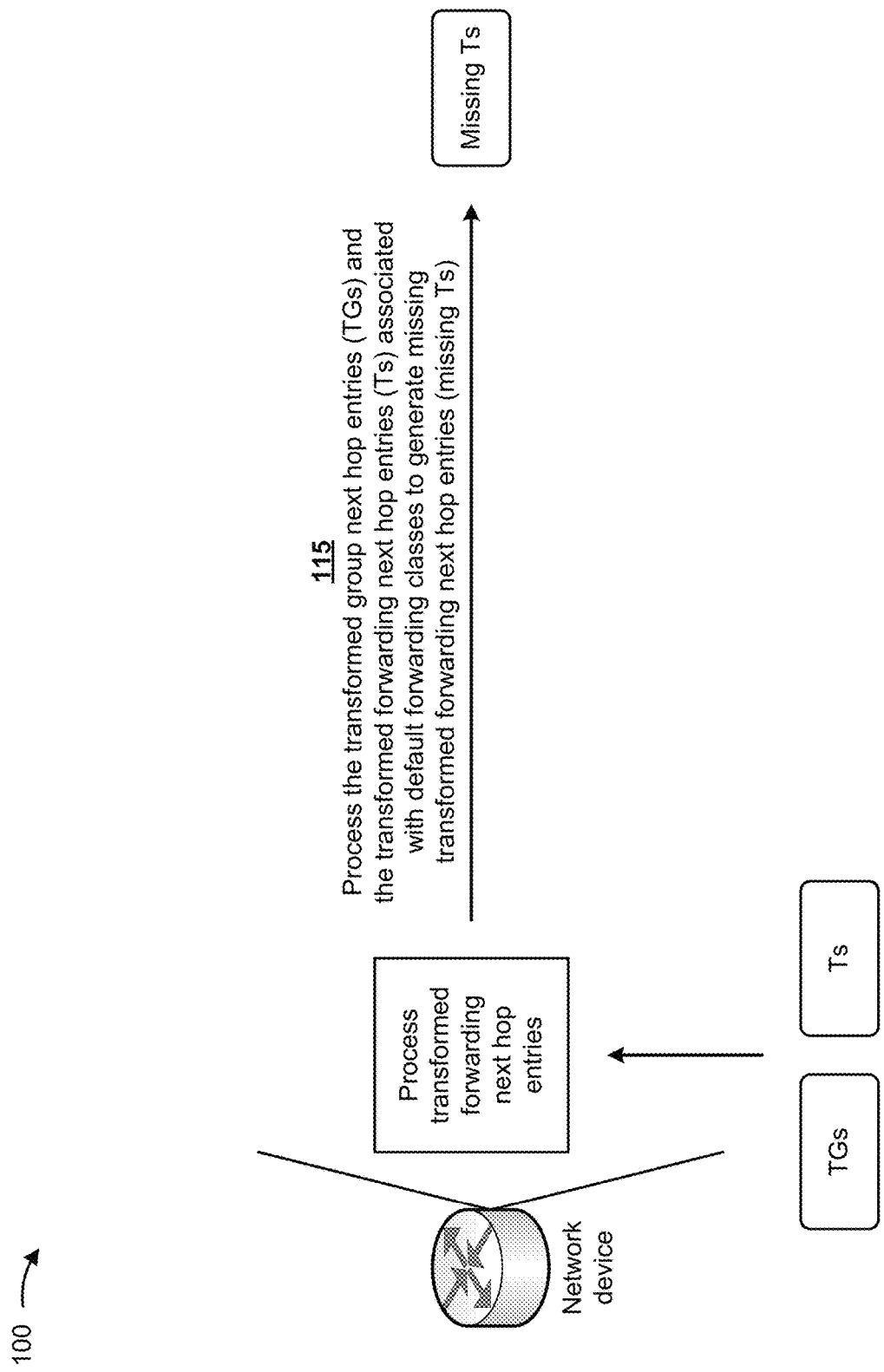

As shown in FIG. 1E, and by reference number 115, the network device may process the transformed group next hop entries and the transformed forwarding next hop entries associated with default forwarding classes to generate missing transformed forwarding next hop entries. For example, the network device may determine the forwarding classes associated with the default forwarding classes. The network device may compare transformed forwarding next hop entries associated with an indexed next hop entry to determine missing forwarding classes. For example, the network device may identify T9 and T10 associated with indexed1. The network device may determine that T9 is associated with the first forwarding class (e.g., FC 0) and T10 is associated with the second forwarding class (e.g., FC 1). The network device may determine that a transformed forwarding next hop entry associated with indexed1 and the third forwarding class (e.g., FC 2) is missing. As a result, the network device may generate a transformed forwarding next hop entry associated with indexed1 and the third forwarding class that has the same forwarding information as the transformed forwarding next hop entry associated with indexed1 and the default forwarding class (e.g., T12). Similarly, the network device may determine that a transformed forwarding next hop entry associated with indexed2 and the second forwarding class (e.g., FC 1) is missing. As a result, the network device may generate a transformed forwarding next hop entry associated with indexed2 and the second forwarding class that has the same forwarding information as the transformed forwarding next hop entry associated with indexed2 and the default forwarding class (e.g., T16).

Figure 1F:
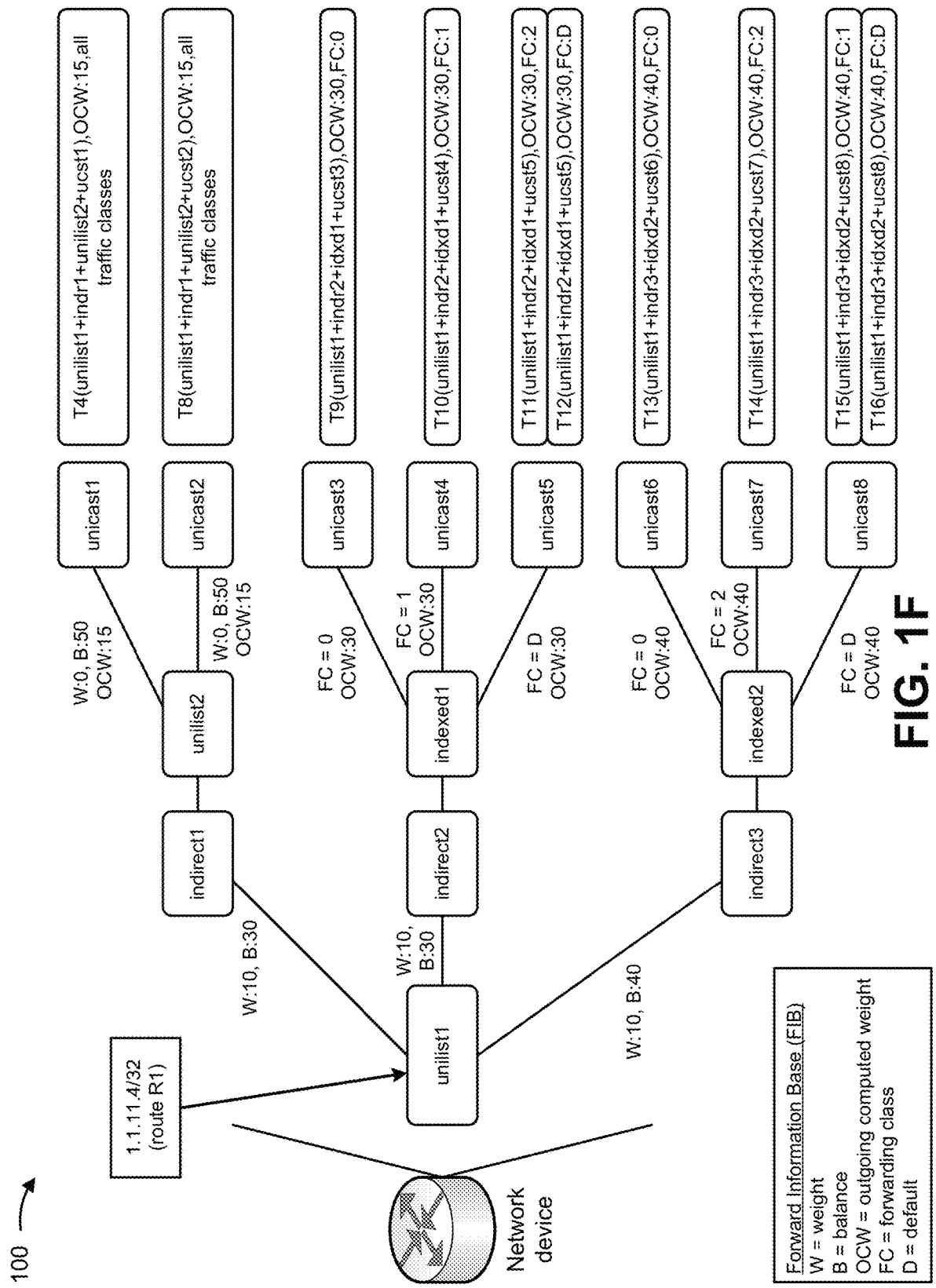

As shown in FIG. 1F, the network device may determine a second set of transformed forwarding next hop entries. The second set of transformed forwarding next hop entries may include the missing transformed forwarding next hop entries (e.g., T11 and T15). The network device may update the transformed group next hop entries based on the second set of transformed forwarding next hop entries. For example, the network device may add T11 to the third transformed group next hop entry (e.g., associated with the third forwarding class) and may add T15 to the second transformed group next hop entry (e.g., associated with the second forwarding class).

As shown in FIG. 1G, and by reference number 120, the network device may process the transformed group next hop entries and the transformed forwarding next hop entries associated with all classes of traffic to generate new transformed forwarding next hop entries. For example, the network device may process the transformed forwarding next hop entries associated with aggregate next hops (e.g., unilist2 and/or the like). The network device may generate new transformed forwarding next hop entries for each forwarding class that have the same forwarding information as the transformed forwarding next hop entries associated with all classes of traffic. For example, the network device may generate new transformed forwarding next hop entries by transforming T4 into four new transformed forwarding next hop entries that have the same forwarding information as T4, but are associated with a specific forwarding class. Similarly, the network device may generate new transformed forwarding next hop entries by transforming T8 into four new transformed forwarding next hop entries. The quantity of new transformed forwarding next hop entries may be based on the quantity of forwarding classes.

Figure 1H:
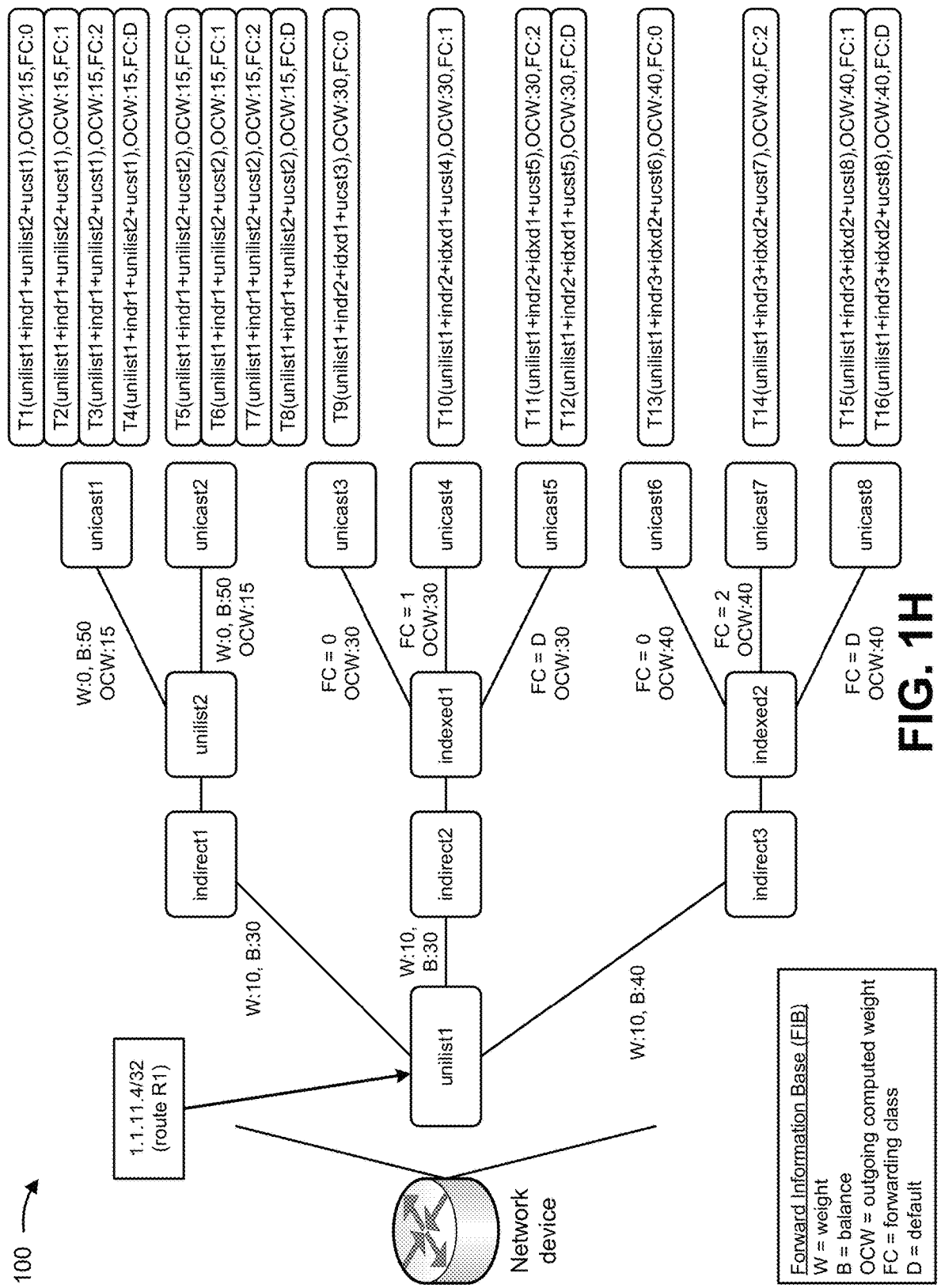

As shown in FIG. 1H, the network device may determine a third set of transformed forwarding next hop entries. The third set of transformed forwarding next hop entries may include the new transformed forwarding next hop entries. For example, the new transformed forwarding next hop entries may include T1 (e.g., associated with unicast1 and the first forwarding class), T2 (e.g., associated with unicast1 and the second forwarding class), T3 (e.g., associated with unicast1 and the second forwarding class), T4 (e.g., associated with unicast1 and the default forwarding class), T5 (e.g., associated with unicast2 and the first forwarding class), T6 (e.g., associated with unicast2 and the second forwarding class), T7 (e.g., associated with unicast2 and the third forwarding class), and T8 (e.g., associated with unicast2 and the default forwarding class). The network device may create a final set of transformed forwarding next hop entries that includes all transformed forwarding next hop entries from the first set of transformed forwarding next hop entries, the second set of transformed forwarding next hop entries, and the third set of transformed forwarding next hop entries (e.g., T1-T16).

The network device may update the transformed group next hop entries based on the third set of transformed forwarding next hop entries. For example, the network device may add T1 and T5 to the first transformed group next hop entry (e.g., associated with the first forwarding class), T2 and T6 to the second transformed group next hop entry (e.g., associated with the second forwarding class), T3 and T7 to the third transformed group next hop entry (e.g., associated with the third forwarding class), and T4 and T8 to the fourth transformed group next hop entry (e.g., associated with the default forwarding class).

As a result, the final set of transformed forwarding next hop entries may include a first subset of transformed forwarding next hop entries associated with the first forwarding class (e.g., FC 0) and the first entry of the transformed group next hop entries (e.g., the first transformed group next hop entry), a second subset of transformed forwarding next hop entries associated with the second forwarding class (e.g., FC 1) and the second entry of the transformed group next hop entries (e.g., the second transformed group next hop entry), a third subset of transformed forwarding next hop entries associated with the third forwarding class (e.g., FC 2) and the third entry of the transformed group next hop entries (e.g., the third transformed group next hop entry), and a fourth subset of transformed forwarding next hop entries associated with the fourth forwarding class (e.g., the default forwarding class) and a fourth entry of the transformed group next hop entries (e.g., the fourth transformed group next hop entry).

As shown in FIG. 1I, and by reference number 125, the network device may group the transformed forwarding next hop entries (e.g., the first set of transformed forwarding next hop entries), the missing transformed forwarding next hop entries (e.g., the second set of transformed forwarding next hop entries), and the new transformed forwarding next hop entries (e.g., the third set of transformed forwarding next hop entries) based on the transformed group next hop entries. For example, the network device may group the transformed forwarding next hop entries included in the final set of transformed forwarding next hop entries based on the transformed group next hop entries (e.g., based on a forwarding class of each transformed group next hop entry).

Figure 1J:
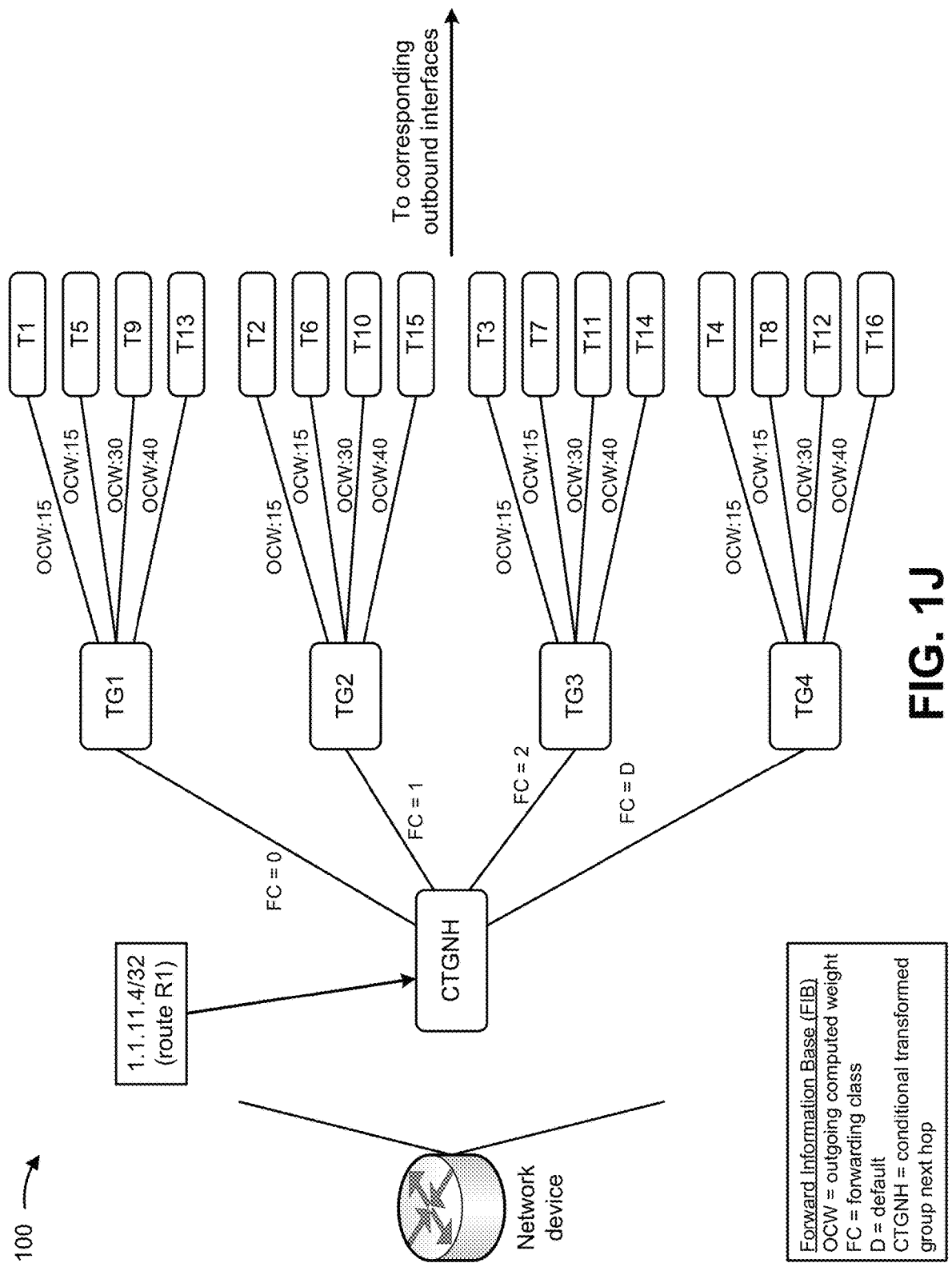

As shown in FIG. 1J, the network device may transform the multi-level hybrid hierarchy FIB format of FIGS. 1A-1H (e.g., the four level (or more) multi-level hybrid hierarchy FIB format) into a three level hierarchy FIB format. The three levels may include a conditional transformed group next hop level (e.g., indicating the conditional transformed group next hop entries), a transformed group next hop level (e.g., indicating the transformed group next hop entries), and a transformed forwarding next hop level (e.g., indicating the transformed forwarding next hop entries). The transformed forwarding next hop entries may be grouped by an associated transformed group next hop entry and/or an associated forwarding class. For example, the three level hierarchy FIB format may indicate a path from the conditional transformed group next hop to the first transformed group next hop (e.g., TG1) and paths to each of the transformed forwarding next hop entries associated with the first transformed group next hop (e.g., T1, T5, T9, and T13). The three level hierarchy FIB format may indicate an outgoing computed weight associated with paths from the first transformed group next hop to an associated transformed forwarding next hop. For example, a path from the first transformed group next hop to transformed forwarding next hop T1 may have an outgoing computed weight of 15, a path from the first transformed group next hop to transformed forwarding next hop T5 may have an outgoing computed weight of 15, a path from the first transformed group next hop to transformed forwarding next hop T9 may have an outgoing computed weight of 30, and a path from the first transformed group next hop to transformed forwarding next hop T13 may have an outgoing computed weight of 40. A sum of the outgoing computed weights of paths from the first transformed group next hop may be 100 (e.g., indicating that the paths from the first transformed group next hop include all potential paths for traffic associated with the first forwarding class (e.g., FC 0).

As a result, the network device may arrange the three level hierarchy FIB format such that traffic distribution over the network to corresponding outbound interfaces may be determined for all forwarding classes. For example, for the second forwarding class (e.g., FC 1), the three level hierarchy FIB format may indicate that 15% (e.g., indicated by an outgoing computed weight of 15) of traffic associated with the second forwarding class may be distributed via transformed forwarding next hop T2, 15% (e.g., indicated by an outgoing computed weight of 15) of traffic associated with the second forwarding class may be distributed via transformed forwarding next hop T6, 30% (e.g., indicated by an outgoing computed weight of 30) of traffic associated with the second forwarding class may be distributed via transformed forwarding next hop T10, and 40% (e.g., indicated by an outgoing computed weight of 40) of traffic associated with the second forwarding class may be distributed via transformed forwarding next hop T15. Similarly, incoming traffic associated with the third forwarding class (e.g., FC 2) may be distributed across outbound interfaces corresponding to transformed forwarding next hop T3, transformed forwarding next hop T7, transformed forwarding next hop T11, and transformed forwarding next hop T14 in the ratio of 15, 15, 30, and 40, respectively. The network device may determine traffic distribution for other forwarding classes in a similar manner.

Figure 1K:
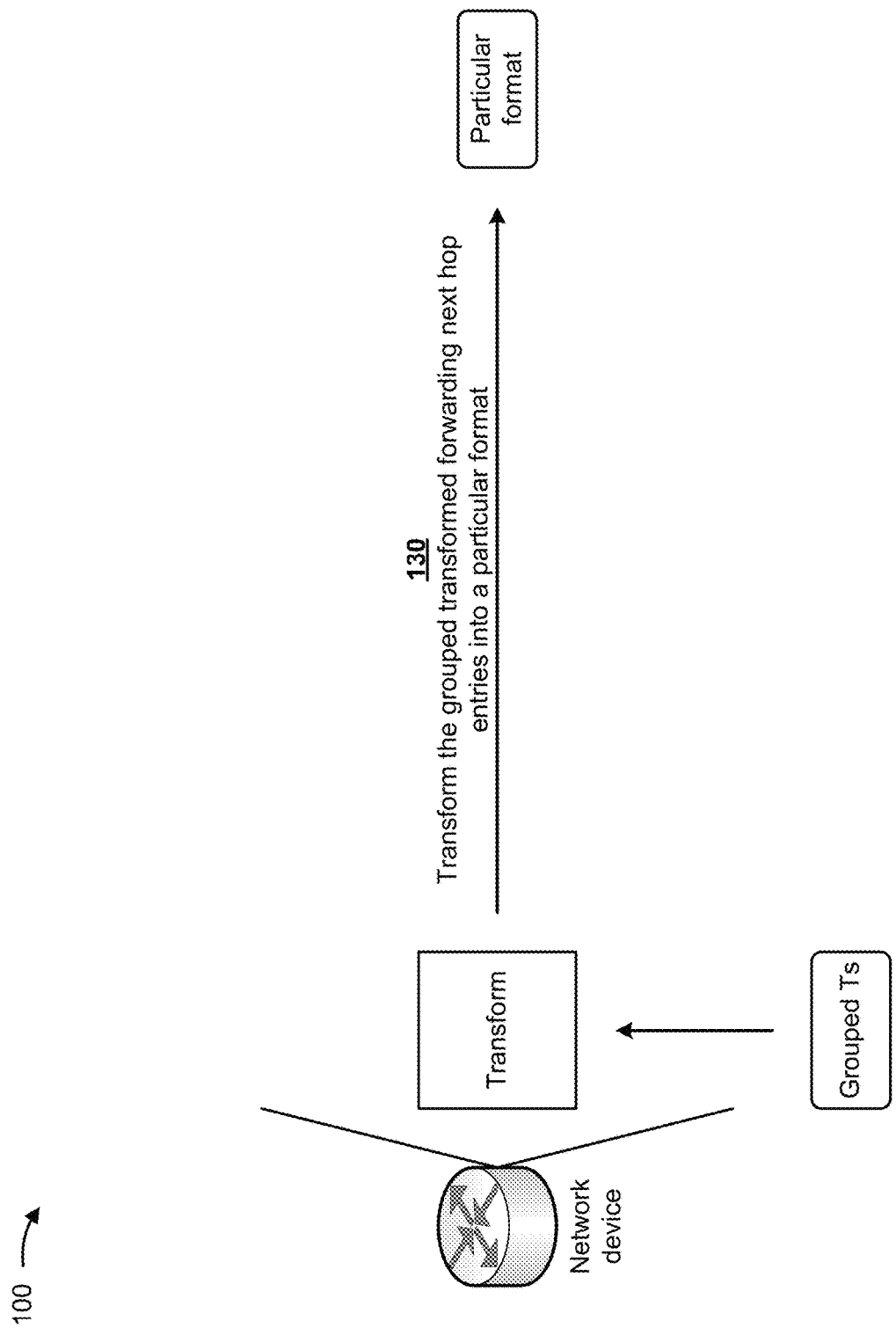

As shown in FIG. 1K, and by reference number 130, the network device may transform the grouped transformed forwarding next hop entries into a particular format. The particular format may be a three level hierarchy address forwarding table format, an openconfig address forwarding table format (OC-AFT), and/or the like. The particular format may include condition identifiers that define ingress classification criteria to apply to a packet received by the network device. For example, the network device may include a condition identifier with a packet (e.g., in a header of the packet) when the packet is received by the network device. The network device may determine the condition identifiers based on the forwarding data, information received from another network device, information contained within a packet received by the network device, information stored within the FIB, and/or the like. The condition identifiers may be used by the network device and/or other network devices to determine a distribution (e.g., a path) for a packet.

Figure 1L:
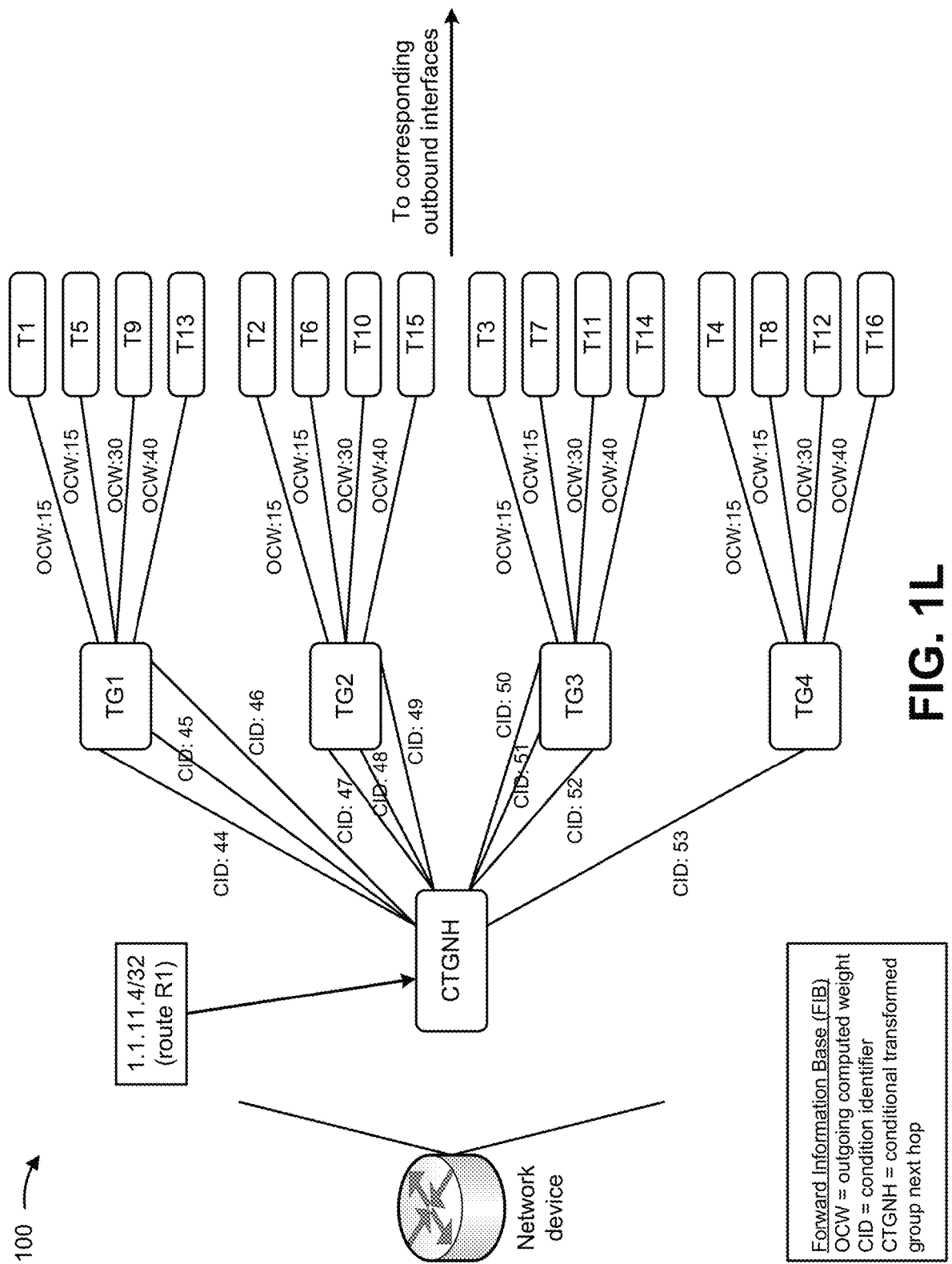

As shown in FIG. 1L, the network device may associate paths from the conditional transformed group next hop to one or more (or all) of the transformed group next hop with one or more condition identifiers. For example, condition identifiers 44, 45, and 46 may be associated with the first transformed group next hop (e.g., TG1), condition identifiers 47, 48, and 49 may be associated with the second transformed group next hop (e.g., TG2), condition identifiers 50, 51, and 52 may be associated with the third transformed group next hop (e.g., TG3), and condition identifier 53 may be associated with the fourth transformed group next hop (e.g., TG4).

The network device may perform the processing of the forwarding data as described above based on a configuration (e.g., a setting and/or the like) of the network device. For example, the configuration may indicate that the network device is to transform forwarding data associated with a multi-level hybrid hierarchy FIB format. In some implementations, the network device may selectively perform the processing of the forwarding data based on an indication in the forwarding data, based on a configuration, based on a user input (e.g., from an administrator of the network), and/or the like.

The network device may store the transformed forwarding next hop entries in the particular format (e.g., as shown in FIG. 1L) in the FIB of the network device. The network device may receive traffic (e.g., a packet) associated with the network. The network device may forward the traffic based on the transformed forwarding next hop entries in the particular format. For example, the network device may determine a forwarding class and/or a condition identifier associated with the traffic. The network device may include the forwarding class and/or the condition identifier with the traffic (e.g., in a header of a packet). The network device may forward the traffic according to the distribution indicated by the transformed forwarding next hop entries in the particular format. The network device may expose the transformed forwarding next hop entries in the particular format to one or more other devices (e.g., one or more other network devices and/or the like) for use consumption purposes (e.g., for monitoring via telemetry).

As a result, the network device may be enabled to determine traffic distribution across outbound interfaces for all forwarding classes of traffic associated with the network. The network device may be enabled to trace traffic distribution for a given destination and a specific forwarding class of the traffic. This may conserve computing resources and/or network resources that would have otherwise been used determining traffic distribution for a given destination and a specific forwarding class using a multi-level hybrid hierarchical FIB format (e.g., that may not include a full traffic distribution for all forwarding classes for a destination).

As indicated above, FIGS. 1A-1L are provided as an example. Other examples may differ from what is described with regard to FIGS. 1A-1L. The number and arrangement of devices shown in FIGS. 1A-1L are provided as an example. In practice, there may be additional devices, fewer devices, different devices, or differently arranged than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices)

shown in FIGS. 1A-1L may perform one or more functions described as being performed by another set of devices shown in FIGS. 1A-1L.

Figure 2:
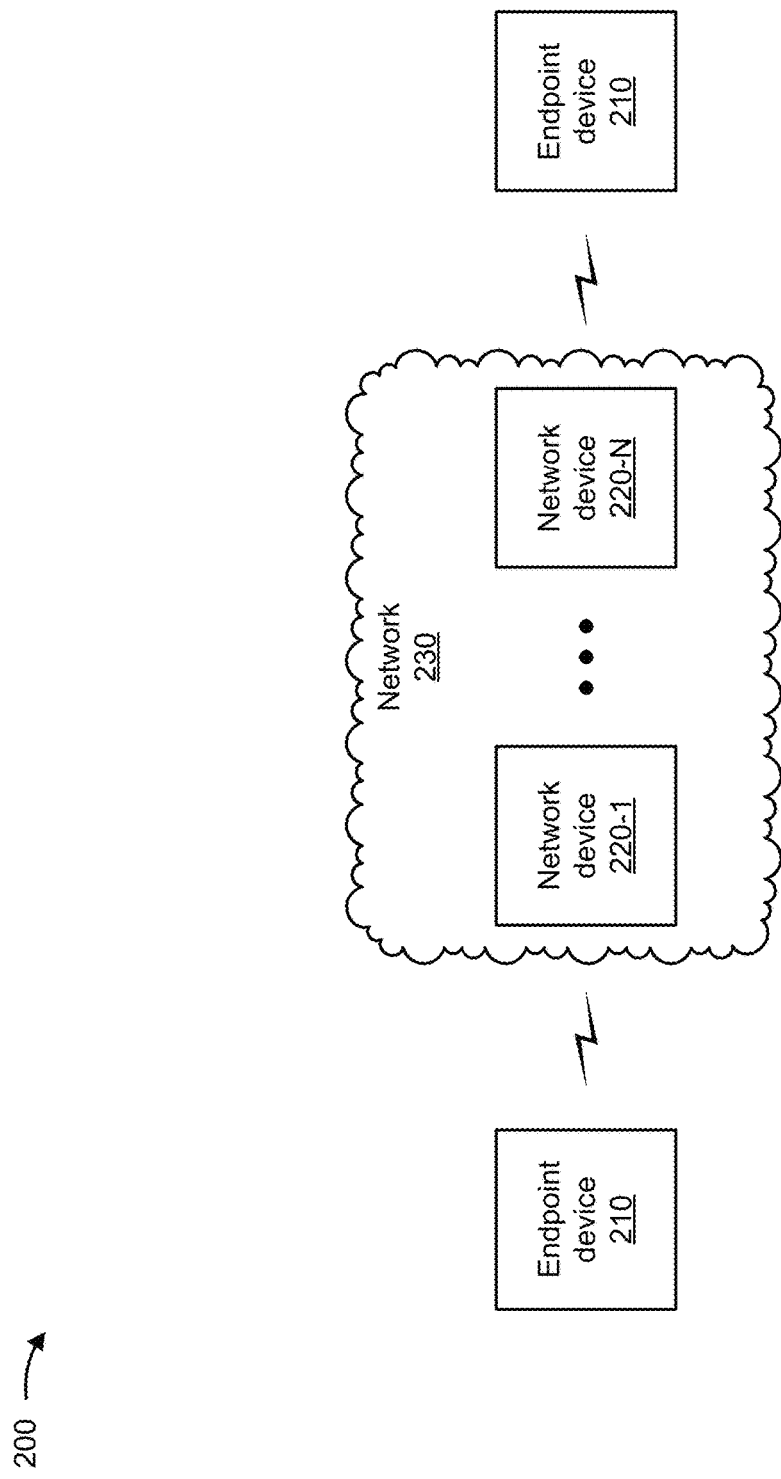
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
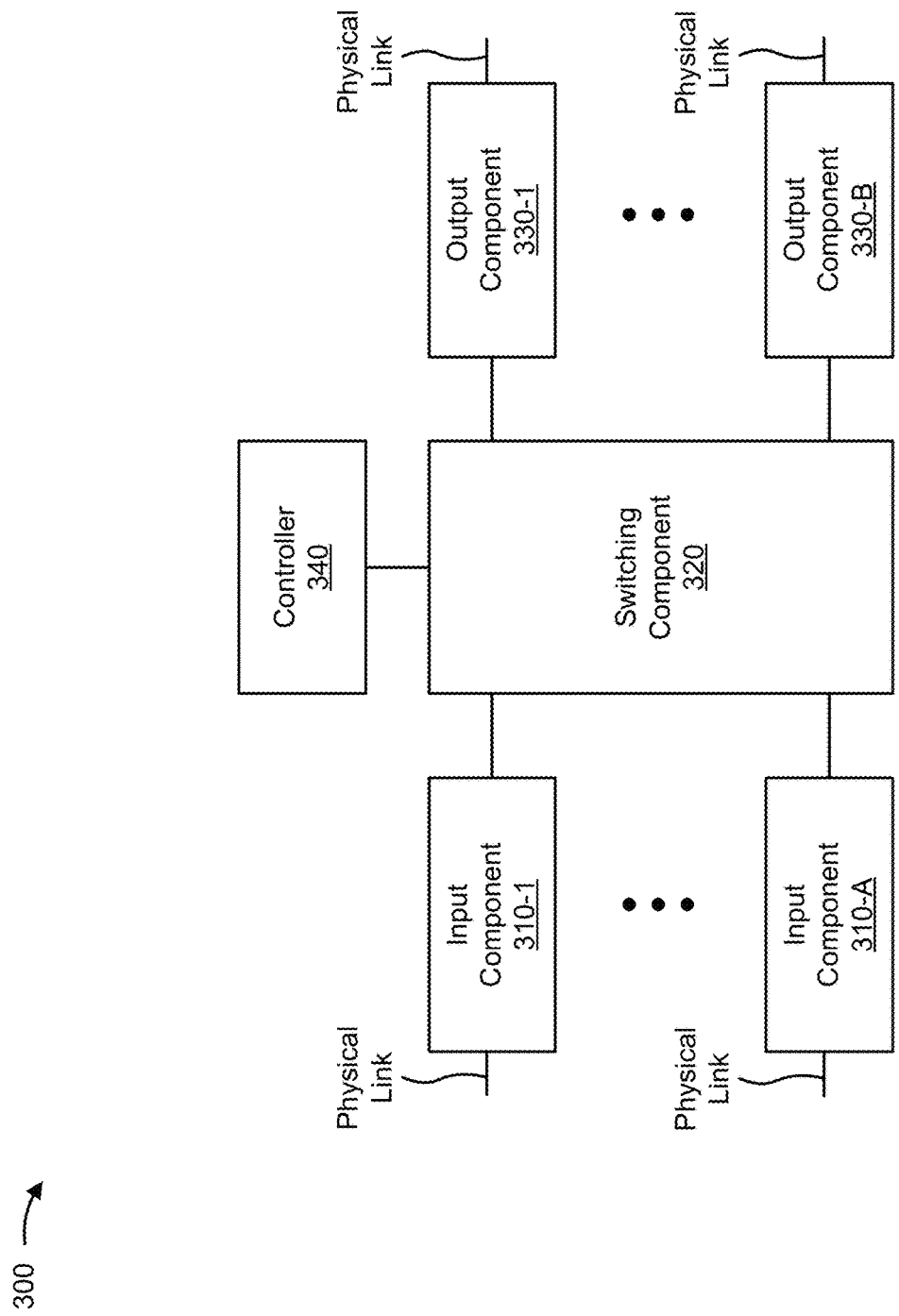
FIG. 3 is a diagram of example components of one or more devices of FIG. 2.

FIG. 3 is a diagram of example components of a device 300. Device 300 may correspond to endpoint device 210, network device 220, and/or the like. In some implementations, endpoint device 210, network device 220, and/or the like may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C (C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
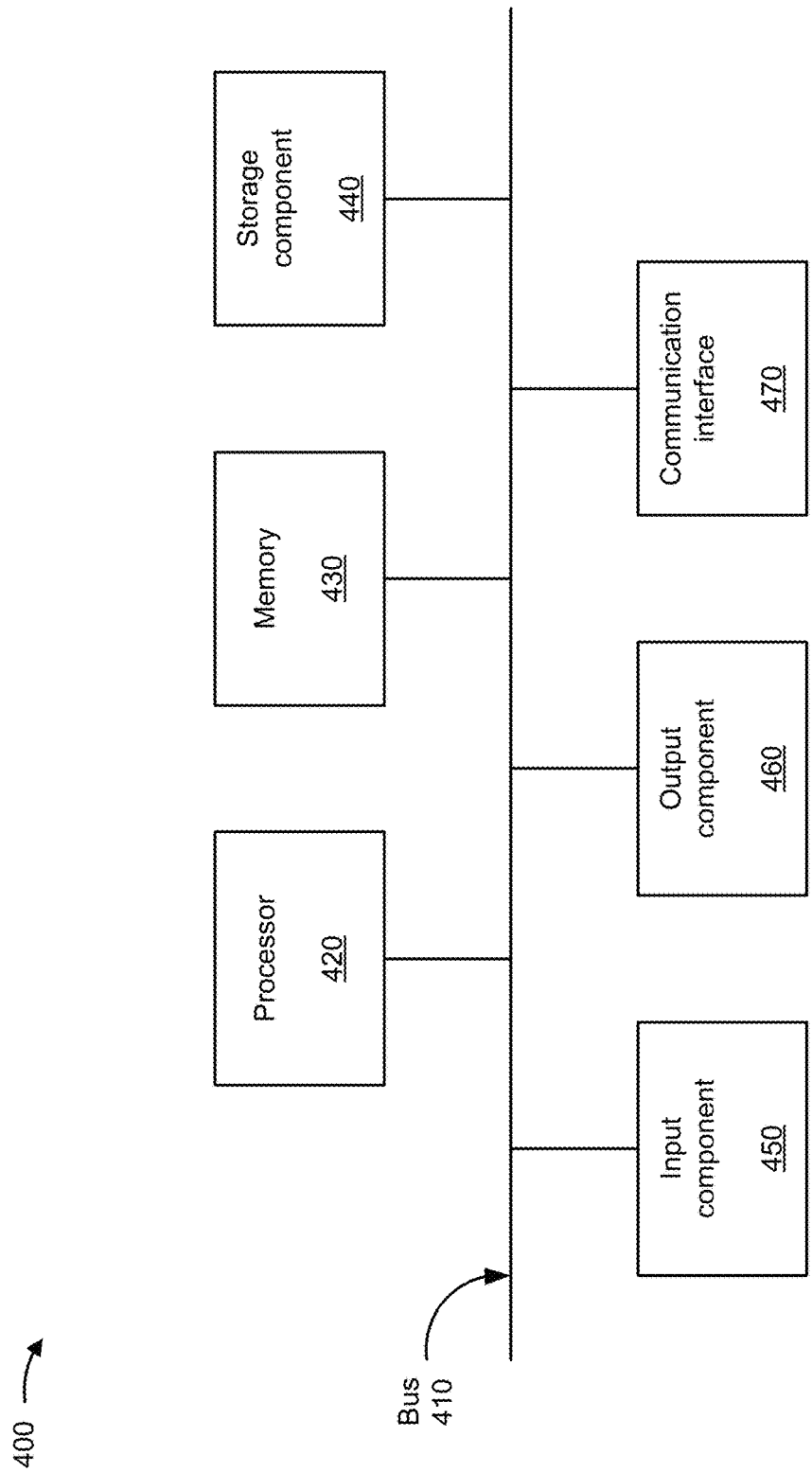
FIG. 4 is a diagram of example components of one or more devices of FIG. 2.

FIG. 4 is a diagram of example components of a device 400. Device 400 may correspond to endpoint device 210, network device 220, and/or the like. In some implementations, endpoint device 210, network device 220, and/or the like may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more LEDs).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, an RF interface, a universal serial bus (USB) interface, a wireless local area interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
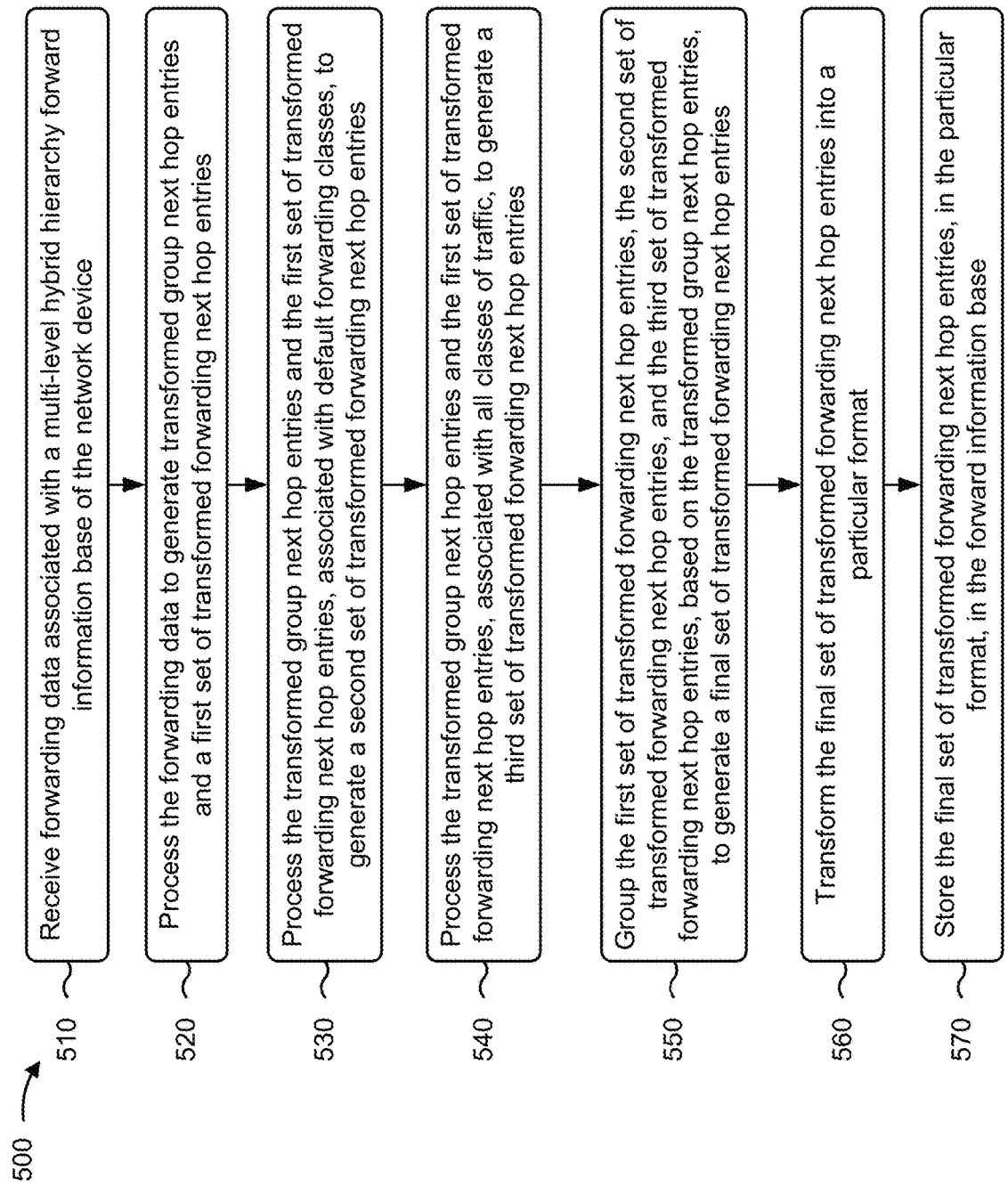
FIGS. 5-7 are flow charts of example processes relating to transforming a multi-level hybrid hierarchical forwarding information base (FIB) format.

FIG. 5 is a flow chart of an example process 500 associated with transforming a multi-level hybrid hierarchical forwarding information base (FIB) format. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210), and/or the like. Additionally, or alternatively, one or more process blocks of FIG. 5 may be performed by one or more components of a device 300 (e.g., input component 310, switching component 320, output component 330, controller 340, and/or the like), a device 400 (e.g., processor 420, memory 430, storage component 440, input component 450, output component 460, communication interface 470, and/or the like), and/or the like.

As shown in FIG. 5, process 500 may include receiving forwarding data associated with a multi-level hybrid hierarchy forwarding information base of the network device (block 510). For example, the network device may receive forwarding data associated with a multi-level hybrid hierarchy forwarding information base of the network device, as described above.

As further shown in FIG. 5, process 500 may include processing the forwarding data to generate transformed group next hop entries and a first set of transformed forwarding next hop entries (block 520). For example, the network device may process the forwarding data to generate transformed group next hop entries and a first set of transformed forwarding next hop entries, as described above.

As further shown in FIG. 5, process 500 may include processing the transformed group next hop entries and the first set of transformed forwarding next hop entries, associated with default forwarding classes, to generate a second set of transformed forwarding next hop entries (block 530). For example, the network device may process the transformed group next hop entries and the first set of transformed forwarding next hop entries, associated with default forwarding classes, to generate a second set of transformed forwarding next hop entries, as described above.

As further shown in FIG. 5, process 500 may include processing the transformed group next hop entries and the first set of transformed forwarding next hop entries, associated with all classes of traffic, to generate a third set of transformed forwarding next hop entries (block 540). For example, the network device may process the transformed group next hop entries and the first set of transformed forwarding next hop entries, associated with all classes of traffic, to generate a third set of transformed forwarding next hop entries, as described above.

As further shown in FIG. 5, process 500 may include grouping the first set of transformed forwarding next hop entries, the second set of transformed forwarding next hop entries, and the third set of transformed forwarding next hop entries, based on the transformed group next hop entries, to generate a final set of transformed forwarding next hop entries (block 550). For example, the network device may group the first set of transformed forwarding next hop entries, the second set of transformed forwarding next hop entries, and the third set of transformed forwarding next hop entries, based on the transformed group next hop entries, to generate a final set of transformed forwarding next hop entries, as described above.

As further shown in FIG. 5, process 500 may include transforming the final set of transformed forwarding next hop entries into a particular format (block 560). For example, the network device may transform the final set of transformed forwarding next hop entries into a particular format, as described above.

As further shown in FIG. 5, process 500 may include storing the final set of transformed forwarding next hop entries, in the particular format, in the forwarding information base (block 570). For example, the network device may store the final set of transformed forwarding next hop entries, in the particular format, in the forwarding information base, as described above.

Process 500 may include additional implementations, such as any single implementation or any combination of implementations described below and/or in connection with one or more other processes described elsewhere herein.

In a first implementation, process 500 includes processing the forwarding data to identify a top level next hop entry in the forwarding data and to create a conditional transformed group next hop entry.

In a second implementation, alone or in combination with the first implementation, process 500 includes receiving traffic associated with a network, and forwarding the traffic based on the final set of transformed forwarding next hop entries in the particular format.

In a third implementation, alone or in combination with one or more of the first and second implementations, the particular format includes a three-level hierarchy address forwarding table format.

In a fourth implementation, alone or in combination with one or more of the first through third implementations, processing the forwarding data to generate the transformed group next hop entries and the first set of transformed forwarding next hop entries comprises processing the forwarding data associated with a first type of next hop to generate a first subset of transformed forwarding next hop entries; processing the forwarding data associated with a second type of next hop to generate a second subset of transformed forwarding next hop entries; processing the forwarding data associated with a third type of next hop to generate a third subset of transformed forwarding next hop entries; processing the forwarding data associated with a fourth type of next hop to generate a fourth subset of transformed forwarding next hop entries; and combining the first subset of transformed forwarding next hop entries, the second subset of transformed forwarding next hop entries, the third subset of transformed forwarding next hop entries, and the fourth subset of transformed forwarding next hop entries to generate the first set of transformed forwarding next hop entries.

In a fifth implementation, alone or in combination with one or more of the first through fourth implementations, the first type of next hop corresponds to an aggregate next hop, the second type of next hop corresponds to an indirect next hop, the third type of next hop corresponds to an indexed next hop, and the fourth type of next hop corresponds to a forwarding next hop.

In a sixth implementation, alone or in combination with one or more of the first through fifth implementations, the final set of transformed forwarding next hop entries includes next hop entries that are each associated with a corresponding outbound interface of the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
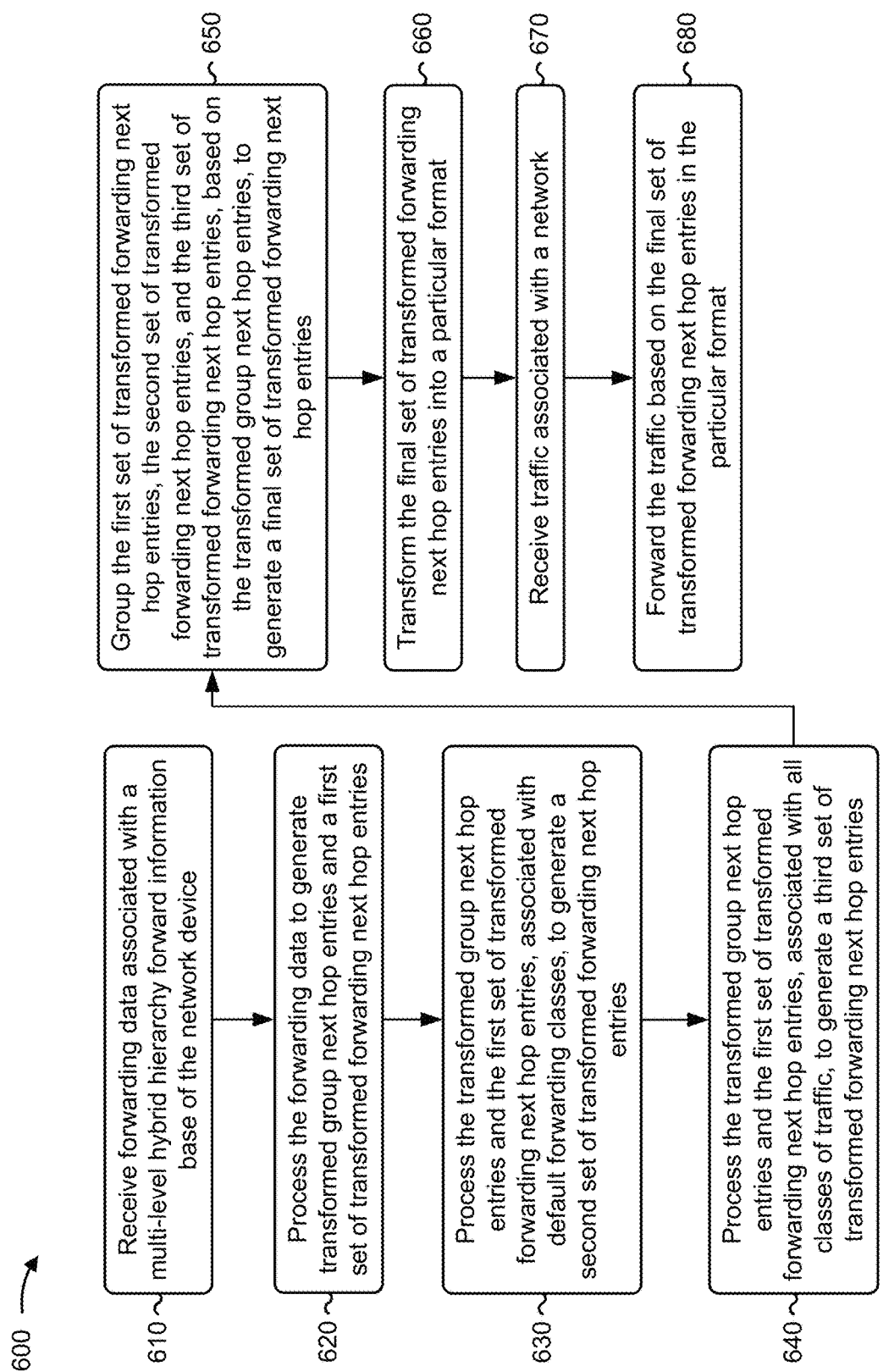

FIG. 6 is a flow chart of an example process 600 associated with transforming a multi-level hybrid hierarchical FIB format. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), and/or the like. Additionally, or alternatively, one or more process blocks of FIG. 6 may be performed by one or more components of a device 300 (e.g., input component 310, switching component 320, output component 330, controller 340, and/or the like), a device 400 (e.g., processor 420, memory 430, storage component 440, input component 450, output component 460, communication interface 470, and/or the like), and/or the like.

As shown in FIG. 6, process 600 may include receiving forwarding data associated with a multi-level hybrid hierarchy forwarding information base of the network device (block 610). For example, the network device may receive forwarding data associated with a multi-level hybrid hierarchy forwarding information base of the network device, as described above.

As further shown in FIG. 6, process 600 may include processing the forwarding data to generate transformed group next hop entries and a first set of transformed forwarding next hop entries (block 620). For example, the network device may process the forwarding data to generate transformed group next hop entries and a first set of transformed forwarding next hop entries, as described above.

As further shown in FIG. 6, process 600 may include processing the transformed group next hop entries and the first set of transformed forwarding next hop entries, associated with default forwarding classes, to generate a second set of transformed forwarding next hop entries (block 630). For example, the network device may process the transformed group next hop entries and the first set of transformed forwarding next hop entries, associated with default forwarding classes, to generate a second set of transformed forwarding next hop entries, as described above.

As further shown in FIG. 6, process 600 may include processing the transformed group next hop entries and the first set of transformed forwarding next hop entries, associated with all classes of traffic, to generate a third set of transformed forwarding next hop entries (block 640). For example, the network device may process the transformed group next hop entries and the first set of transformed forwarding next hop entries, associated with all classes of traffic, to generate a third set of transformed forwarding next hop entries, as described above.

As further shown in FIG. 6, process 600 may include grouping the first set of transformed forwarding next hop entries, the second set of transformed forwarding next hop entries, and the third set of transformed forwarding next hop entries, based on the transformed group next hop entries, to generate a final set of transformed forwarding next hop entries (block 650). For example, the network device may group the first set of transformed forwarding next hop entries, the second set of transformed forwarding next hop entries, and the third set of transformed forwarding next hop entries, based on the transformed group next hop entries, to generate a final set of transformed forwarding next hop entries, as described above.

As further shown in FIG. 6, process 600 may include transforming the final set of transformed forwarding next hop entries into a particular format (block 660). For example, the network device may transform the final set of transformed forwarding next hop entries into a particular format, as described above.

As further shown in FIG. 6, process 600 may include receiving traffic associated with a network (block 670). For example, the network device may receive traffic associated with a network, as described above.

As further shown in FIG. 6, process 600 may include forwarding the traffic based on the final set of transformed forwarding next hop entries in the particular format (block 680). For example, the network device may forward the traffic based on the final set of transformed forwarding next hop entries in the particular format, as described above.

Process 600 may include additional implementations, such as any single implementation or any combination of implementations described below and/or in connection with one or more other processes described elsewhere herein.

In a first implementation, the second set of transformed forwarding next hop entries includes transformed forwarding next hop entries that are missing from the first set of transformed forwarding next hop entries.

In a second implementation, alone or in combination with the first implementation, the third set of transformed forwarding next hop entries includes new transformed forwarding next hop entries associated with forwarding classes included in the first set of transformed forwarding next hop entries.

In a third implementation, alone or in combination with one or more of the first and second implementations, the final set of transformed forwarding next hop entries includes: a first subset of transformed forwarding next hop entries associated with a first forwarding class and a first entry of the transformed group next hop entries, a second subset of transformed forwarding next hop entries associated with a second forwarding class and a second entry of the transformed group next hop entries, a third subset of transformed forwarding next hop entries associated with a third forwarding class and a third entry of the transformed group next hop entries, and a fourth subset of transformed forwarding next hop entries associated with a fourth forwarding class and a fourth entry of the transformed group next hop entries.

In a fourth implementation, alone or in combination with one or more of the first through third implementations, the particular format includes openconfig address forwarding table format.

In a fifth implementation, alone or in combination with one or more of the first through fourth implementations, the final set of transformed forwarding next hop entries in the particular format includes condition identifiers that define ingress classification criteria to apply to a packet.

In a sixth implementation, alone or in combination with one or more of the first through fifth implementations, the multi-level hybrid hierarchy forwarding information base includes four or more levels.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
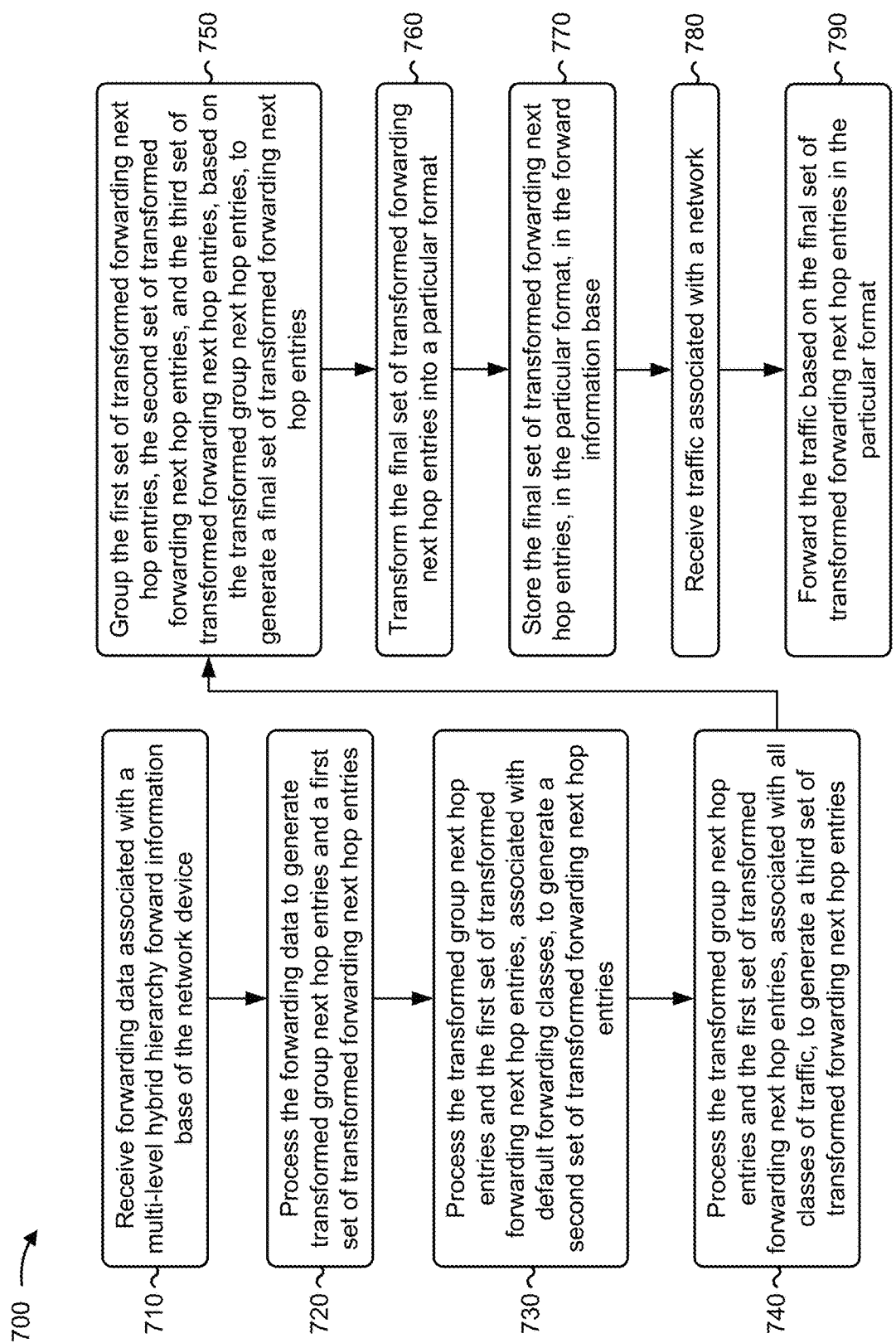

FIG. 7 is a flow chart of an example process 700 associated with transforming a multi-level hybrid hierarchical FIB format. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210) and/or the like. Additionally, or alternatively, one or more process blocks of FIG. 7 may be performed by one or more components of a device 300 (e.g., input component 310, switching component 320, output component 330, controller 340, and/or the like), a device 400 (e.g., processor 420, memory 430, storage component 440, input component 450, output component 460, communication interface 470, and/or the like), and/or the like.

As shown in FIG. 7, process 700 may include receiving forwarding data associated with a multi-level hybrid hierarchy forwarding information base of the network device (block 710). For example, the network device may receive forwarding data associated with a multi-level hybrid hierarchy forwarding information base of the network device, as described above.

As further shown in FIG. 7, process 700 may include processing the forwarding data to generate transformed group next hop entries and a first set of transformed forwarding next hop entries (block 720). For example, the network device may process the forwarding data to generate transformed group next hop entries and a first set of transformed forwarding next hop entries, as described above.

As further shown in FIG. 7, process 700 may include processing the transformed group next hop entries and the first set of transformed forwarding next hop entries, associated with default forwarding classes, to generate a second set of transformed forwarding next hop entries (block 730). For example, the network device may process the transformed group next hop entries and the first set of transformed forwarding next hop entries, associated with default forwarding classes, to generate a second set of transformed forwarding next hop entries, as described above.

As further shown in FIG. 7, process 700 may include processing the transformed group next hop entries and the first set of transformed forwarding next hop entries, associated with all classes of traffic, to generate a third set of transformed forwarding next hop entries (block 740). For example, the network device may process the transformed group next hop entries and the first set of transformed forwarding next hop entries, associated with all classes of traffic, to generate a third set of transformed forwarding next hop entries, as described above.

As further shown in FIG. 7, process 700 may include grouping the first set of transformed forwarding next hop entries, the second set of transformed forwarding next hop entries, and the third set of transformed forwarding next hop entries, based on the transformed group next hop entries, to generate a final set of transformed forwarding next hop entries (block 750). For example, the network device may group the first set of transformed forwarding next hop entries, the second set of transformed forwarding next hop entries, and the third set of transformed forwarding next hop entries, based on the transformed group next hop entries, to generate a final set of transformed forwarding next hop entries, as described above.

As further shown in FIG. 7, process 700 may include transforming the final set of transformed forwarding next hop entries into a particular format (block 760). For example, the network device may transform the final set of transformed forwarding next hop entries into a particular format, as described above.

As further shown in FIG. 7, process 700 may include storing the final set of transformed forwarding next hop entries, in the particular format, in the forwarding information base (block 770). For example, the network device may store the final set of transformed forwarding next hop entries, in the particular format, in the forwarding information base, as described above.

As further shown in FIG. 7, process 700 may include receiving traffic associated with a network (block 780). For example, the network device may receive traffic associated with a network, as described above.

As further shown in FIG. 7, process 700 may include forwarding the traffic based on the final set of transformed forwarding next hop entries in the particular format (block 790). For example, the network device may forward the traffic based on the final set of transformed forwarding next hop entries in the particular format, as described above.

Process 700 may include additional implementations, such as any single implementation or any combination of implementations described below and/or in connection with one or more other processes described elsewhere herein.

In a first implementation, process 700 includes processing the forwarding data to identify a top level next hop entry in the forwarding data and to create a conditional transformed group next hop entry.

In a second implementation, alone or in combination with the first implementation, processing the forwarding data to generate the transformed group next hop entries and the first set of transformed forwarding next hop entries includes processing the forwarding data associated with a first type of next hop to generate a first subset of transformed forwarding next hop entries; processing the forwarding data associated with a second type of next hop to generate a second subset of transformed forwarding next hop entries; processing the forwarding data associated with a third type of next hop to generate a third subset of transformed forwarding next hop entries; processing the forwarding data associated with a fourth type of next hop to generate a fourth subset of transformed forwarding next hop entries; and combining the first subset of transformed forwarding next hop entries, the second subset of transformed forwarding next hop entries, the third subset of transformed forwarding next hop entries, and the fourth subset of transformed forwarding next hop entries to generate the first set of transformed forwarding next hop entries.

In a third implementation, alone or in combination with one or more of the first and second implementations, the final set of transformed forwarding next hop entries includes next hop entries that are each associated with a corresponding outbound interface of the network device.

In a fourth implementation, alone or in combination with one or more of the first through third implementations, the second set of transformed forwarding next hop entries includes transformed forwarding next hop entries that are missing from the first set of transformed forwarding next hop entries, and the third set of transformed forwarding next hop entries includes new transformed forwarding next hop entries associated with forwarding classes included in the first set of transformed forwarding next hop entries.

In a fifth implementation, alone or in combination with one or more of the first through fourth implementations, the multi-level hybrid hierarchy forwarding information base includes four or more levels.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, forwarding data associated with a multi-level hybrid hierarchy forwarding information base of the network device;
   processing, by the network device, the forwarding data to generate transformed group next hop entries and a first set of transformed forwarding next hop entries;
   processing, by the network device, the transformed group next hop entries and the first set of transformed forwarding next hop entries, associated with default forwarding classes, to generate a second set of transformed forwarding next hop entries,
      wherein processing the transformed group next hop entries and the first set of transformed next hop entries, associated with the default forwarding classes, to generate the second set of transformed forwarding next hop entries comprises:
         determining forwarding classes associated with the default forwarding classes;
   processing, by the network device, the transformed group next hop entries and the first set of transformed forwarding next hop entries, associated with all classes of traffic, to generate a third set of transformed forwarding next hop entries;
   grouping, by the network device and based on the forwarding classes, the first set of transformed forwarding next hop entries, the second set of transformed forwarding next hop entries, and the third set of transformed forwarding next hop entries, based on the transformed group next hop entries, to generate a final set of transformed forwarding next hop entries;
   transforming, by the network device, the final set of transformed forwarding next hop entries into a particular format to be configured to represent traffic distribution for all forwarding classes; and
   storing, by the network device, the final set of transformed forwarding next hop entries, in the particular format, in the forwarding information base.

2. The method of claim 1, further comprising:
   processing the forwarding data to identify a top level next hop entry in the forwarding data and to create a conditional transformed group next hop entry.

3. The method of claim 1, further comprising:
   receiving traffic associated with a network; and
   forwarding the traffic based on the final set of transformed forwarding next hop entries in the particular format.

4. The method of claim 1, wherein the particular format includes a three-level hierarchy address forwarding table format.

5. The method of claim 1, wherein processing the forwarding data to generate the transformed group next hop entries and the first set of transformed forwarding next hop entries comprises:
   processing the forwarding data associated with a first type of next hop to generate a first subset of transformed forwarding next hop entries;
   processing the forwarding data associated with a second type of next hop to generate a second subset of transformed forwarding next hop entries;
   processing the forwarding data associated with a third type of next hop to generate a third subset of transformed forwarding next hop entries;
   processing the forwarding data associated with a fourth type of next hop to generate a fourth subset of transformed forwarding next hop entries; and
   combining the first subset of transformed forwarding next hop entries, the second subset of transformed forwarding next hop entries, the third subset of transformed forwarding next hop entries, and the fourth subset of transformed forwarding next hop entries to generate the first set of transformed forwarding next hop entries.

6. The method of claim 5, wherein:
   the first type of next hop corresponds to an aggregate next hop,
   the second type of next hop corresponds to an indirect next hop,
   the third type of next hop corresponds to an indexed next hop, and
   the fourth type of next hop corresponds to a forwarding next hop.

7. The method of claim 1, wherein the final set of transformed forwarding next hop entries includes next hop entries that are each associated with a corresponding outbound interface of the network device.

8. A network device, comprising:
one or more memories; and
one or more processors to:
receive forwarding data associated with a multi-level hybrid hierarchy forwarding information base of the network device;
process the forwarding data to generate transformed group next hop entries and a first set of transformed forwarding next hop entries;
process the transformed group next hop entries and the first set of transformed forwarding next hop entries, associated with default forwarding classes, to generate a second set of transformed forwarding next hop entries,
wherein the one or more processors, when processing the transformed group next hop entries and the first set of transformed next hop entries, associated with the default forwarding classes, to generate the second set of transformed forwarding next hop entries, are to:
determine forwarding classes associated with the default forwarding classes;
process the transformed group next hop entries and the first set of transformed forwarding next hop entries, associated with all classes of traffic, to generate a third set of transformed forwarding next hop entries;
group, based on the forwarding classes, the first set of transformed forwarding next hop entries, the second set of transformed forwarding next hop entries, and the third set of transformed forwarding next hop entries, based on the transformed group next hop entries, to generate a final set of transformed forwarding next hop entries;
transform the final set of transformed forwarding next hop entries into a particular format to be configured to represent traffic distribution for all forwarding classes;
receive traffic associated with a network; and
forward the traffic based on the final set of transformed forwarding next hop entries in the particular format.

9. The network device of claim 8, wherein the second set of transformed forwarding next hop entries includes transformed forwarding next hop entries that are missing from the first set of transformed forwarding next hop entries.

10. The network device of claim 8, wherein the third set of transformed forwarding next hop entries includes new transformed forwarding next hop entries associated with forwarding classes included in the first set of transformed forwarding next hop entries.

11. The network device of claim 8, wherein the final set of transformed forwarding next hop entries includes:
a first subset of transformed forwarding next hop entries associated with a first forwarding class and a first entry of the transformed group next hop entries,
a second subset of transformed forwarding next hop entries associated with a second forwarding class and a second entry of the transformed group next hop entries,
a third subset of transformed forwarding next hop entries associated with a third forwarding class and a third entry of the transformed group next hop entries, and
a fourth subset of transformed forwarding next hop entries associated with a fourth forwarding class and a fourth entry of the transformed group next hop entries.

12. The network device of claim 8, wherein the particular format includes openconfig address forwarding table format.

13. The network device of claim 8, wherein the final set of transformed forwarding next hop entries in the particular format includes condition identifiers that define ingress classification criteria to apply to a packet.

14. The network device of claim 8, wherein the multi-level hybrid hierarchy forwarding information base includes four or more levels.

15. A non-transitory computer-readable medium storing instructions, the instructions comprising:
one or more instructions that, when executed by one or more processors of a network device, cause the one or more processors to:
receive forwarding data associated with a multi-level hybrid hierarchy forwarding information base of the network device;
process the forwarding data to generate transformed group next hop entries and a first set of transformed forwarding next hop entries;
process the transformed group next hop entries and the first set of transformed forwarding next hop entries, associated with default forwarding classes, to generate a second set of transformed forwarding next hop entries,
wherein the one or more instructions that cause the one or more processors to process the transformed group next hop entries and the first set of transformed next hop entries, associated with the default forwarding classes, to generate the second set of transformed forwarding next hop entries, cause the one or more processors to:
determine forwarding classes associated with the default forwarding classes;
process the transformed group next hop entries and the first set of transformed forwarding next hop entries, associated with all classes of traffic, to generate a third set of transformed forwarding next hop entries;
group, based on the forwarding classes, the first set of transformed forwarding next hop entries, the second set of transformed forwarding next hop entries, and the third set of transformed forwarding next hop entries, based on the transformed group next hop entries, to generate a final set of transformed forwarding next hop entries;
transform the final set of transformed forwarding next hop entries into a particular format to be configured to represent traffic distribution for all forwarding classes;
store the final set of transformed forwarding next hop entries, in the particular format, in the forwarding information base;
receive traffic associated with a network; and
forward the traffic based on the final set of transformed forwarding next hop entries in the particular format.

16. The non-transitory computer-readable medium of claim 15, wherein the one or more instructions, when executed by the one or more processors, further cause the one or more processors to:
process the forwarding data to identify a top level next hop entry in the forwarding data and to create a conditional transformed group next hop entry.

17. The non-transitory computer-readable medium of claim 15, wherein the one or more instructions, that cause the one or more processors to process the forwarding data to generate the transformed group next hop entries and the first set of transformed forwarding next hop entries, cause the one or more processors to:
  process the forwarding data associated with a first type of next hop to generate a first subset of transformed forwarding next hop entries;
  process the forwarding data associated with a second type of next hop to generate a second subset of transformed forwarding next hop entries;
  process the forwarding data associated with a third type of next hop to generate a third subset of transformed forwarding next hop entries;
  process the forwarding data associated with a fourth type of next hop to generate a fourth subset of transformed forwarding next hop entries; and
  combine the first subset of transformed forwarding next hop entries, the second subset of transformed forwarding next hop entries, the third subset of transformed forwarding next hop entries, and the fourth subset of transformed forwarding next hop entries to generate the first set of transformed forwarding next hop entries.

18. The non-transitory computer-readable medium of claim 15, wherein the final set of transformed forwarding next hop entries includes next hop entries that are each associated with a corresponding outbound interface of the network device.

19. The non-transitory computer-readable medium of claim 15, wherein:
  the second set of transformed forwarding next hop entries includes transformed forwarding next hop entries that are missing from the first set of transformed forwarding next hop entries, and
  the third set of transformed forwarding next hop entries includes new transformed forwarding next hop entries associated with forwarding classes included in the first set of transformed forwarding next hop entries.

20. The non-transitory computer-readable medium of claim 15, wherein the multi-level hybrid hierarchy forwarding information base includes four or more levels.

* * * * *